United States Patent [19]

Liew et al.

[11] Patent Number: 5,662,855

[45] Date of Patent: Sep. 2, 1997

[54] METHOD OF MAKING NEAR NET SHAPED FIBROUS STRUCTURES

[75] Inventors: Ronnie Sze-Heng Liew; Edward Lee Morris, Jr., both of Pueblo; Philip William Sheehan, Pueblo West, all of Colo.

[73] Assignee: The B.F. Goodrich Company, Akron, Ohio

[21] Appl. No.: 245,383

[22] Filed: May 17, 1994

[51] Int. Cl.$^6$ ............................. B22D 19/14; B29D 22/00

[52] U.S. Cl. ......................... 264/258; 264/262; 156/184; 156/195

[58] Field of Search ................................ 264/257, 258, 264/262; 428/36.1, 225, 234, 293, 294, 300, 902, 36.2, 36.3, 37, 188, 222; 156/193, 194, 195, 184; 28/107, 110, 142; 87/5, 6

[56] References Cited

U.S. PATENT DOCUMENTS

| | | |
|---|---|---|
| 1,610,173 | 12/1926 | Slade . |
| 2,587,945 | 3/1952 | Wirth . |
| 2,602,766 | 7/1952 | Francis . |
| 3,007,497 | 11/1961 | Shobert . |
| 3,457,962 | 7/1969 | Shobert . |
| 3,657,061 | 4/1972 | Carlson et al. . |
| 4,018,482 | 4/1977 | Rastogi et al. . |
| 4,494,436 | 1/1985 | Kreusi . |
| 4,613,017 | 9/1986 | Bok . |
| 4,621,662 | 11/1986 | Olry . |
| 4,657,795 | 4/1987 | Foret . |
| 4,775,566 | 10/1988 | Landry et al. . |
| 4,790,052 | 12/1988 | Olry . |
| 4,878,563 | 11/1989 | Baden et al. . |
| 4,946,722 | 8/1990 | Moyer . |
| 4,955,123 | 9/1990 | Lawton et al. . |
| 5,052,446 | 10/1991 | Gysin . |
| 5,081,754 | 1/1992 | Lawton et al. . |
| 5,113,568 | 5/1992 | Lawton et al. ........................ 29/419.1 |
| 5,217,770 | 6/1993 | Morris, Jr. et al. ....................... 428/225 |
| 5,312,660 | 5/1994 | Morris et al. ........................... 428/36.3 |

FOREIGN PATENT DOCUMENTS

| | | |
|---|---|---|
| 0232059A2 | 1/1987 | European Pat. Off. . |
| 0424988A1 | 1/1987 | European Pat. Off. . |
| 2911762 | 9/1980 | Germany . |
| 2012671 | 6/1982 | United Kingdom . |
| 2099365 | 12/1982 | United Kingdom . |
| 9315250 | 8/1993 | WIPO . |

*Primary Examiner*—David A. Simmons
*Assistant Examiner*—Kenneth M. Jones
*Attorney, Agent, or Firm*—David M. Ronyak

[57] ABSTRACT

Fibrous substrates for the production of carbon and/or ceramic (including mixtures of these) fiber reinforced carbon and/or ceramic (including mixtures of these) composites and to methods of manufacture of same. A shaped fibrous structure comprising at least a first fibrous tape layer of a width generally corresponding to that of the fibrous structure to be formed, the first fibrous tape layer superposed upon and joined to least one other fibrous layer by needlepunching to produce cross-linking of the layers by fibers displaced out of the layers and extending in a direction generally perpendicular to the faces of the layers, and methods of making same. A shaped fibrous structure comprising at least a first fibrous tape layer formed from a plurality of tape portions each having a width substantially less than that of the fibrous structure to be formed, the selvedges of the tape portions being partially overlapped, the first fibrous tape layer superposed upon and joined to least one other fibrous layer by needlepunching to produce cross-linking of the layers by fibers displaced out of the layers and extending in a direction generally perpendicular to the faces of the layers, and methods of making same. The structure may include a plurality of helically wound fibrous tapes arranged to form a flat annulus having a plurality of interleaved fibrous layers. The structure may be used in the production of friction pads or discs.

32 Claims, 16 Drawing Sheets

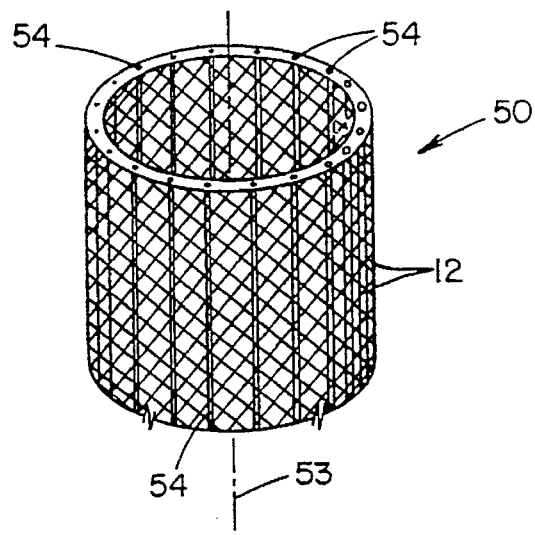
FIG. 5
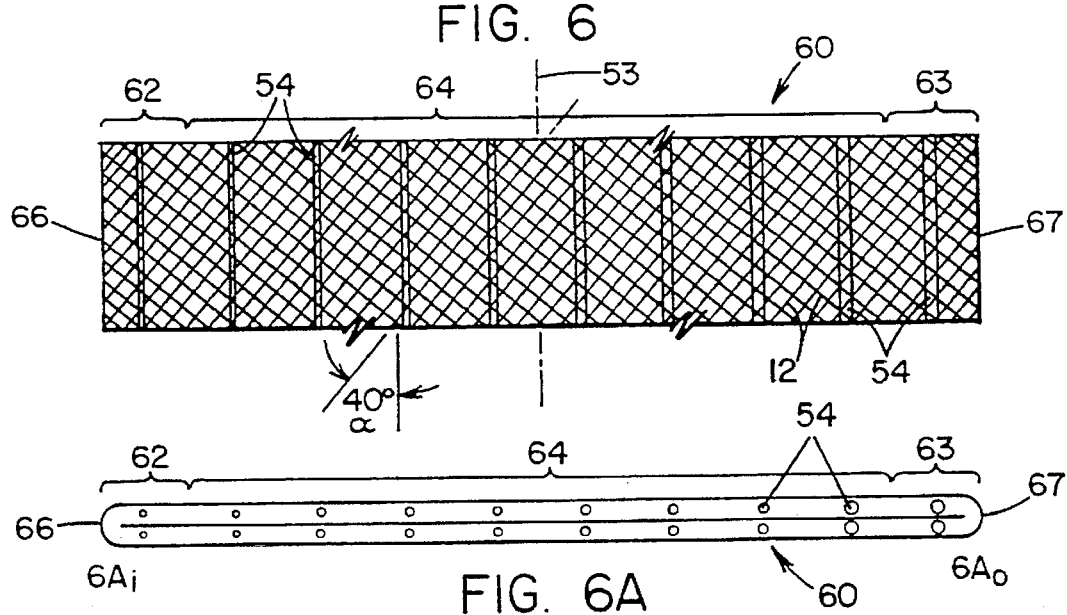
FIG. 6
FIG. 6A
FIG. 6B

METHOD OF MAKING NEAR NET SHAPED FIBROUS STRUCTURES

This invention relates to fibrous substrates for the production of carbon and/or ceramic (including mixtures of these) fiber reinforced carbon and/or ceramic (including mixtures of these) composites and to methods of manufacture of same.

Exemplary of such a composite is a carbon fiber/carbon matrix brake disc made by depositing a carbon matrix on a carbon fiber substrate of the invention, the fibrous material of the substrate being carbonized to reinforce the carbon matrix with carbon fibers. Deposition of carbon on the substrate is effected by in situ cracking of a carbon bearing gas (hereinafter referred to as carbon vapor deposition, abbreviated "CVD" or carbon vapor infiltration, abbreviated "CVI", as these terms are used interchangeably for purposes of the present invention) or by repeatedly impregnating the substrate with a carbon bearing resin and thereafter charring such resin or a combination of such methods to densify the carbon matrix on the carbonized substrate. The invention is not directed to formation of the carbon matrix or densification of the carbon fiber substrate, but rather to the substrate, its preparation, and subsequent densification in known manner to provide a carbon fiber reinforced composite, especially one suitable for use as a friction disc in a brake or clutch.

Substrates according to the invention may be prepared from virgin or recycled fiber derived from composites or preforms formed from carbon fiber or a precursor of carbon fiber.

A preferred material for use in the invention is polyacrylonitrile (PAN) fiber which, particularly if CVD is to be employed, is preferably in an oxidized condition which facilitates subsequent carbonization. Greige PAN fiber and carbon fiber or graphite fiber may also be found to be suitable. Oxidized PAN fiber (which may hereinafter be referred to as "OPF") is available commercially in various forms, including tows, yarns, woven and non-woven fabrics, knit fabrics and felts. For the present invention, the preferred starting form is OPF tow, preferably in the size range of from about 6 k to about 24 k, with 12 k being suitable for most aircraft friction disc applications. Suitable 12 k tows may be obtained from Zoltek of Bridgeton, Mo., and RKT of Muir of Ord, Scotland. Tows and/or yarns of PAN fibers, carbon fibers, graphite fibers, ceramic fibers, precursors of carbon fibers and precursors of ceramic fibers, and mixtures of these may be used. As used herein the term "tow" is used to refer to a continuous strand of continuous filaments. As used herein the term "yarn" is used to refer to a continuous strand of continuous or staple fibers or blends of these; thus the term "yarn" encompasses tow. Continuous fiber is generally preferred over discontinuous fiber due to enhanced mechanical properties in the resultant composite product.

In certain known processes (including those disclosed in U.S. Pat. No. 3,657,061 to Carlson et al., and U.S. Pat. No. 4,790,052 to Olry) for the manufacture of carbon fiber reinforced friction discs, such as brake discs employed on aircraft, annuli are cut out of parallel-sided sheets of PAN fiber material to form one or more substrate annuli. If the parallel-sided PAN sheet material is not of sufficient thickness, two or more such annuli are stacked and joined by needlepunching to form a friction disc substrate or preform. This procedure results in considerable wastage of expensive PAN or OPF sheet and the offcut material cannot be reprocessed to continuous filament form to make a new continuous filament sheet.

According to Lawton et al. U.S. Pat. Nos. 4,955,123; 5,081,754; 5,113,568; and 5,184,387, the amount of offcut waste generated in the production of preforms to be used in production of discs for aircraft braking systems is reduced by preparation of a shaped filamentary structure in the following manner: needlepunching a unidirectional layer of filaments to provide a degree of dimensional stability; cutting a plurality of segments from the unidirectional layer of needlepunched material; assembling a plurality of such segments in side-by-side contiguous relationship to produce a filamentary layer of the required structural shape; superposing at least one similar layer on the first layer; and needlepunching the superposed layers to assemble and join the segments. According to Lawton et al., wastage of the fibrous material is reduced because it is possible to lay out the segmental shapes to enable maximum use of filamentary material. Nevertheless this approach results in offcut material because the segments must be cut from the sheet in various orientations relative to the tow direction.

While there are known processes for recycling offcut PAN sheet waste material (such as that described in GB 2 012 671A which describes a process for recycling PAN sheet material by chopping it into staple fibers and thereafter forming a new fabric sheet by needlepunching a layer of carded (recycled) staple fibers to a substantially unidirectional array of continuous filaments extending transversely to the average direction of the carded staple fibers, from which reformed sheet material annuli are again cut out and the off-cut fabric sheet material may again be recycled), it remains desired to utilize a process for conversion of PAN or OPF tow into a near net shape friction disc preform which minimizes or does not generate such offcut material.

U.S. Pat. No. 5,217,770 to Morris and Liew entitled BRAIDED SHAPED FILAMENTARY STRUCTURES AND METHODS OF MAKING, which is herein incorporated by reference, describes the efficient manufacture of friction discs and fibrous preforms therefor by needlepunching stacked layers of braided fibrous material, but there remains a desire for greater flexibility in the manufacture of friction discs and fibrous preforms.

It is an object of certain embodiments of the present invention to minimize off-cut fibrous material when forming fibrous preforms to be used in the manufacture of friction discs.

It is a further object of certain embodiments of the invention to provide a near net shape annular friction disc preform.

It is a further object of certain embodiments of the invention to provide a needlepunched structure which offers improved mechanical properties compared to certain known structures.

It is still a further object of certain embodiments of the invention to provide a needlepunched annular structure which is circumferentially continuous and circumferentially homogenous.

It is yet another object of certain embodiments of the invention to provide an annular needlepunched structure which is radially anisotropic.

According to an aspect of the invention there is provided a method of making a near net shape multi-layered fibrous structure having a width and a thickness comprising the steps of: providing a flat stack of layers of fibrous material one layer on top of another, each layer having a width generally corresponding to that of the fibrous structure to be formed; forming at least one of said layers of at least two laterally adjacent portions of fibrous tape of a width less than the width of the fibrous structure to be formed; and needlepunching the stacked layers to produce cross-linking of the layers by fibers displaced out of the layers and extending in a direction generally perpendicular to the faces of the layers.

According to another aspect of the invention there is provided a shaped fibrous structure having a width and a thickness, the structure comprising a flat stack of layers of fibrous material one layer on top of another, each layer having a width generally corresponding to that of the fibrous structure; one of said layers being formed of at least two parallel laterally adjacent fibrous tape portions each of a width less than the width of the fibrous structure; and joined by needlepunching to produce cross-linking of the layers by fibers displaced out of the layers and extending in a direction generally perpendicular to the faces of the layers.

It is believed that suitable preforms can be made from various fibrous tapes including braided, knit, woven and non-woven fabrics that are needlepunched as they are stacked or coiled layer upon layer.

The above and other features and advantages of the invention will become more apparent when considered in light of the following description of preferred embodiments of the invention in conjunction with the accompanying drawings which also form a part of the specification.

BRIEF DESCRIPTION OF THE DRAWING

FIG. 5 is an elevational schematic view of a tubular braided structure having a braid angle α.

FIG. 6 is a plan view of a flattened straight tubular braided structure having a braid angle α of 40 degrees.

FIG. 6A is a sectional view taken along line $6A_i$–$6A_o$ of FIG. 6.

FIG. 6B is a sectional view of an alternate embodiment of a flattened tubular braid containing longitudinals which are unequally spaced apart from one another.

DETAILED DESCRIPTION OF PREFERRED EMBODIMENTS

Figure 1:
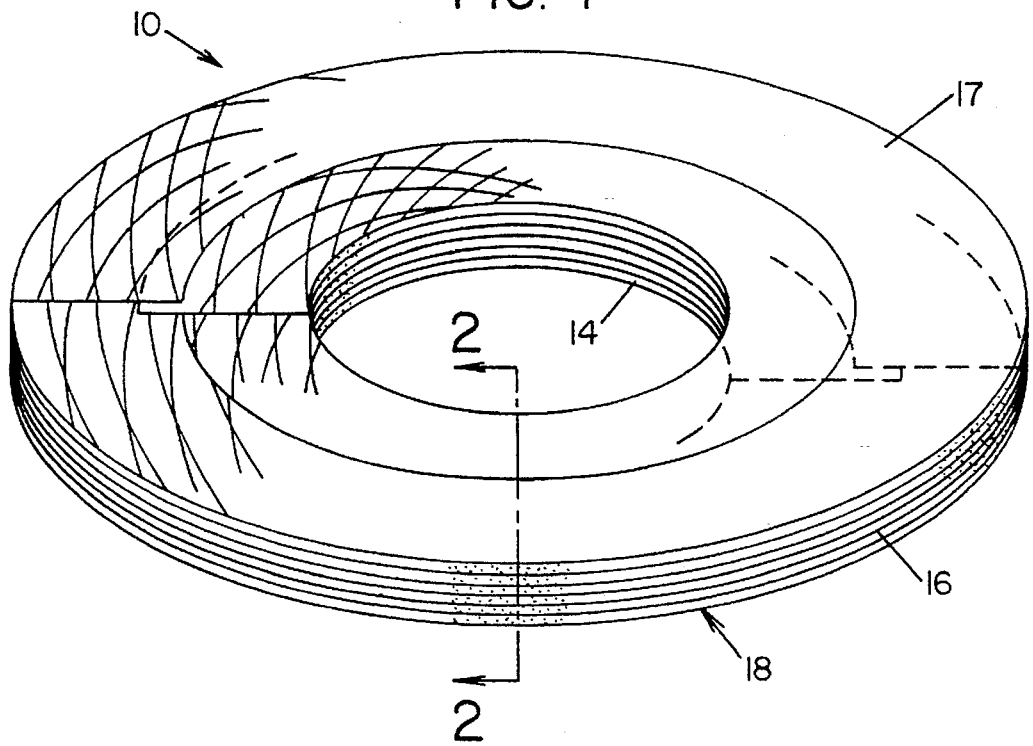
FIG. 1 is an isometric view of a friction disc according to an embodiment of the invention.
Figure 10:
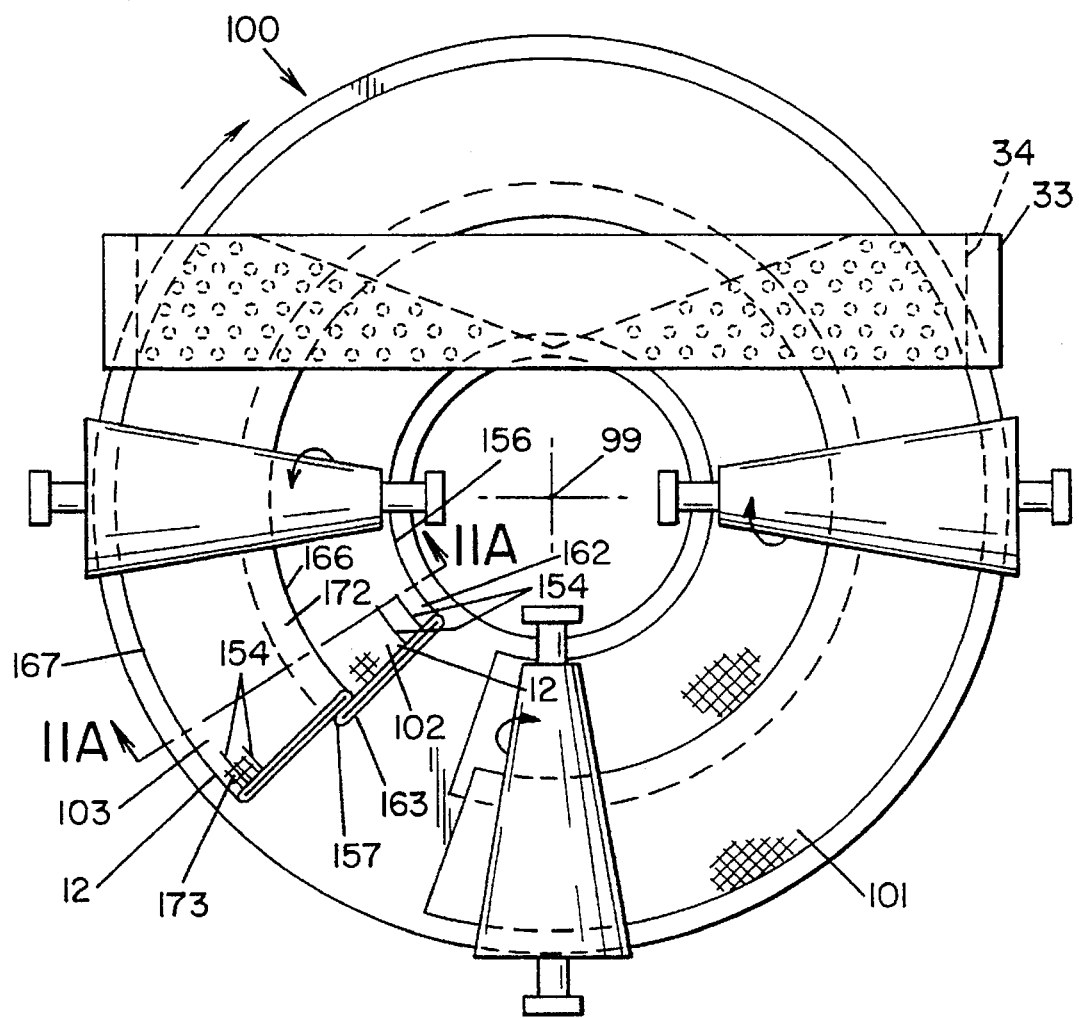
FIG. 10 is a schematic plan view of an embodiment of a preform according to the invention being formed from a pair of parallel precurved overlapped braids.

Referring to FIG. 1, friction disc 10 comprises superposed layers of braided curved tapes derived from tows 12 of OPF cross-linked to one another by needlepunching to consolidate and densify the preform disc such as that shown in FIG. 10, the OPF having been converted to carbon fiber and further densified after needlepunching by carbon matrix deposition using conventional CVI processes. In other embodiments, the cross-linked layers may have deposited thereon a matrix of carbon, ceramic, precursor of carbon, precursor of ceramic, and mixtures of these to further bind together the cross-linked layers.

Due to the braided structure of friction disc 10 which is formed from preform disc 100 shown in FIG. 10, each of the tows within the disc 10 is substantially continuous (except to the extent it has been severed by machining the inner and outer cylindrical peripheral surfaces 14, 16 of the disc 10 or its flat, parallel wear faces 17, 18) and passes in periodic manner over and under other tow members forming the braid and from the outside periphery 173 to the inside periphery 172 of the braid or braids 102, 103 from which disc 10 is formed as it extends circumferentially about the disc. Continuous fiber is generally preferred over discontinuous fiber due to higher mechanical properties in the resultant composite friction disc product.

Figure 7:
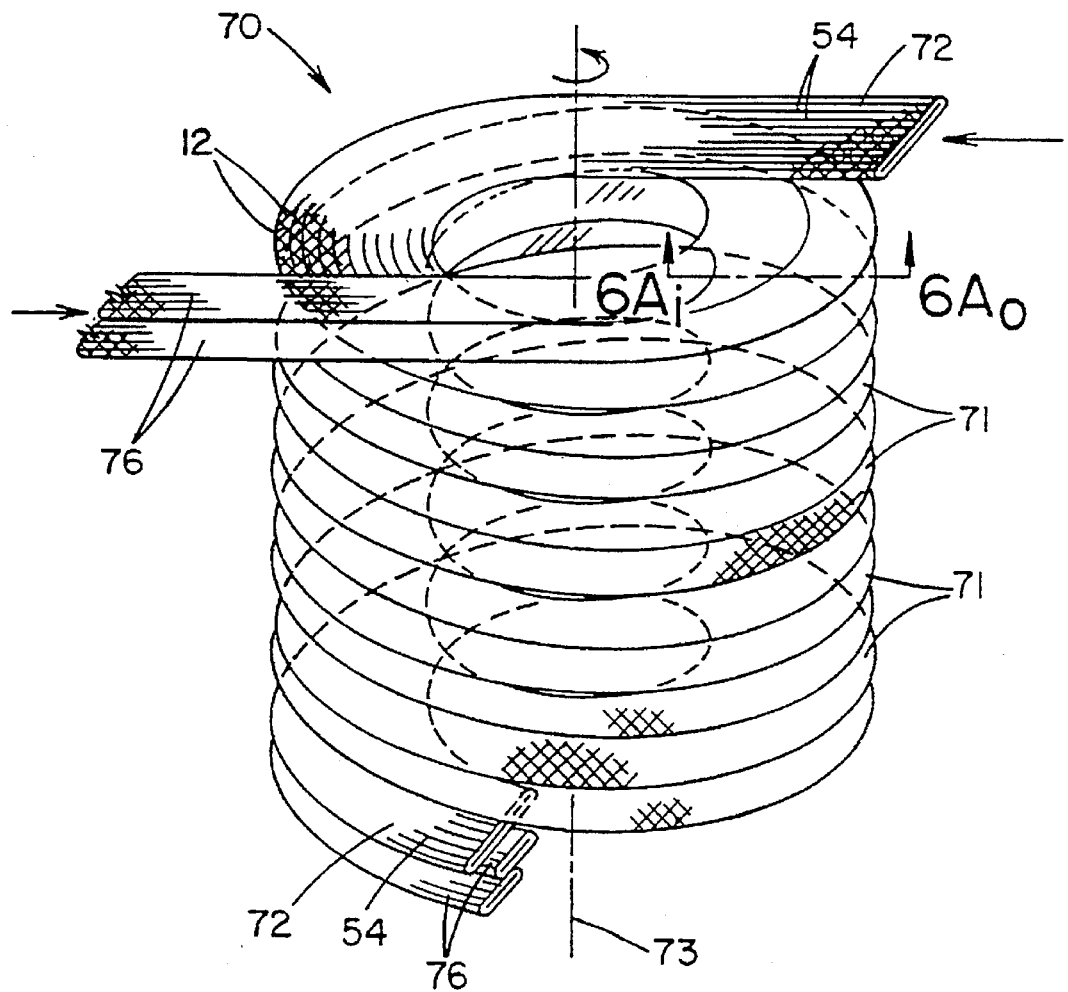
FIG. 7 is an exploded schematic view of an embodiment of a annular preform according to the invention formed of a first and second interleaved helices.

Two or more helically wound fibrous tapes may be arranged to form a flat annulus having a plurality of interleaved fibrous layers prior to needlepunching. The fibrous tape may formed by collapsing a helical hollow tubular braid. As shown in ghost lines in FIG. 7, a helical fibrous tape formed of flattened partially overlapped braids 76 may be interleaved with helical turns 71 of additional braid 72. The additional helical fibrous tape itself may be formed from a plurality of fibrous tapes including but not limited to side by side partially overlapped braids.

Figure 2:
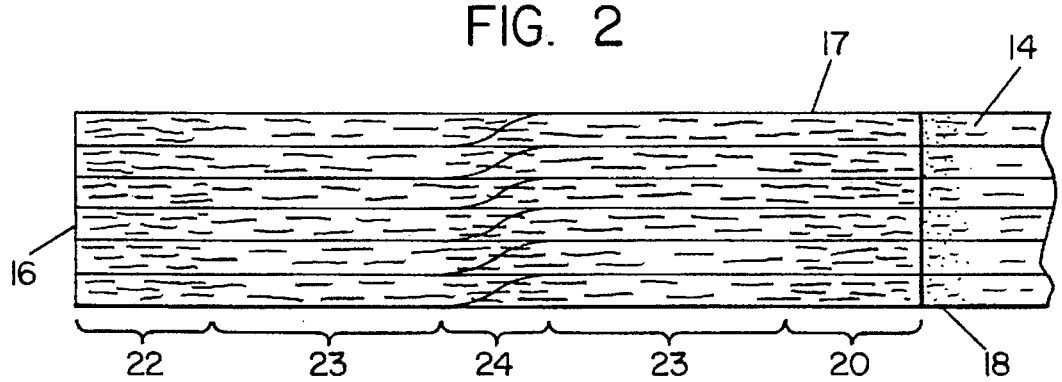
FIG. 2 is an enlarged sectional view taken along line 2—2 of FIG. 1, depicting schematically the fiber distribution therein.

As shown in FIG. 2, the fiber volume, i.e., the quantity of fiber per unit volume which is usually expressed as a percentage with zero percent meaning that no fiber is present and 100 percent meaning that only fiber is present, is greater in region 20 which is located adjacent the inner periphery 14 of disc 10 and in region 22 which is located adjacent the outer periphery 16 of disc 10, than in the remainder of the disc 10. This variation in fiber volume is a natural result of forming an otherwise uniform straight tubular braid such as braid 50 shown in FIG. 5 into a flattened annulus. As the straight tubular braid 50 is flattened to form flattened braid 60 shown in FIG. 6, which is a double thickness fabric strip as shown in FIG. 6A, folded back regions 62, 63 inherently occur at the respective lengthwise extending edges 66, 67 of the flattened braid 60. Each such folded back region 62, 63 has a higher fiber volume than in the central region 64 between such respective folded back edges 66, 67. Also, when a straight braid such as braid 50 or flattened braid 60 is curved into an annulus or arcuate portion thereof, the members forming the braid are forced closer together adjacent the inner periphery of the annulus and pulled apart adjacent the outer periphery of the annulus relative to the central region of the annulus. This naturally occurring deviation in fiber volume in a curved braided tape can be minimized by braiding techniques hereinafter described. Alternatively, a predetermined deviation in fiber volume can be used to advantage to provide additional fibrous reinforcement to drive lugs to be formed in the outer or inner periphery by machining the resulting densified friction disc. Central region 24 is located between regions 20 and 22 of disc 10 and has a higher fiber volume than regions 23 forming the remainder of disc 10 due overlapping of two parallel fed braids from which disc 10 was formed.

In certain preferred embodiments, in addition to the braiding members which extend in helical paths relative to the lengthwise direction of the braid, a system of longitudinal members is introduced into the braid as it is formed. These longitudinal members may be referred to as "unidirectionals". These unidirectionals increase the dimensional stability as well as the tensile strength, compressive strength and moduli, and fiber volume of the braided fabric. Unidirectionals are introduced from stationary guide eyes in the braiding machine such that the unidirectionals will lie straight (without crimp) parallel to the braid axis (longitudinal direction of the braid) while the helical braid members introduced by the braiding machine carriers pass over and under them as the braided fabric is formed.

Having reference to FIG. 6A, flattened braid 60 includes unidirectionals 54 which vary in size in a progressively increasing manner from folded back region 62 toward folded back region 63, thereby compensating for the deviation in fiber volume which otherwise inherently occurs as a uniform straight tubular braid is flattened and curved to form an annulus having region 62 adjacent the ID (inside diameter) of the annulus and region 63 adjacent the OD (outside diameter) of the annulus. While a smooth progression in size is shown in FIG. 6A, it is also within the invention to use an array in which all of the unidirectionals are of the same size but their spacing is varied in a predetermined manner as they are introduced into the tubular braid as it is being formed. As shown in FIG. 6B, unidirectionals 54' of flattened tubular braid 60' are spaced apart from one another in varying manner from inside edge 66' toward outside edge 67', with the unidirectionals 54' being progressively more closely spaced apart from one another as outside edge 67' is approached from the direction of inside edge 66'. It is also within the invention to concurrently employ variations in size, spacing, tension and material in the array of unidirectionals. The unidirectionals may be of different material than the members introduced by the carriers of the braiding machine.

Figure 11A:
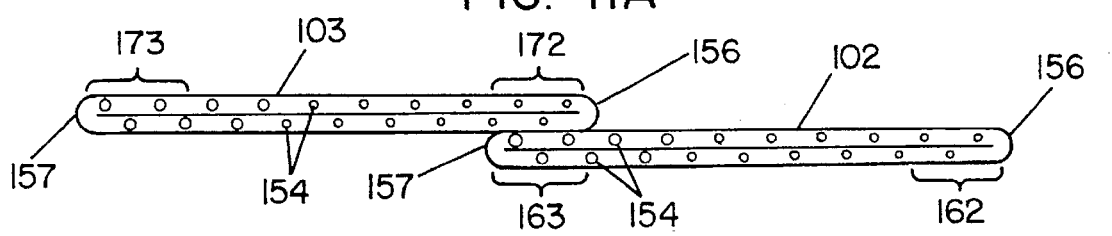
FIG. 11A is a sectional schematic view taken along line 11—11 of FIG. 10.

Having reference to FIGS. 10 and 11A, there is shown the manufacture of a preform 100 from which friction disc 10 shown in FIGS. 1 and 2 is made. Each of flattened precurved braids 102, 103 is formed of tows 12 and includes unidirectionals 154 which vary in size in a predetermined manner between spaced first and second selvedge portions 156, 157 of the braid. In the particular embodiment illustrated in FIG. 11A, the unidirectionals 154 progressively increase in size from folded back region 162 toward folded back region 163, thereby offsetting the deviation in fiber volume which otherwise inherently occurs as a uniform straight tubular braid 102 is flattened and curved to form an annulus having region 162 adjacent the ID (inside diameter) periphery of the annulus and region 163 adjacent the OD (outside diameter) periphery of the annulus. In like manner, flattened braid 103 includes unidirectionals 154 that progressively increase in size from folded back region 172 toward folded back region 173, thereby compensating for the deviation in fiber volume which otherwise inherently occurs as a uniform straight tubular braid 103 is flattened and curved to form an annulus having region 172 adjacent the ID periphery of the annulus and region 173 adjacent the OD periphery of the annulus. Because the regions 163 and 172 of respective braids 102, 103 are overlapped, to avoid excess fiber volume, these regions in certain preferred embodiments contain less unidirectional fiber contribution, and may contain zero unidirectionals.

As shown in FIG. 11A, the unidirectionals 154 increase in size progressively from the ID periphery to the OD periphery of each braid.

Figure 11B:
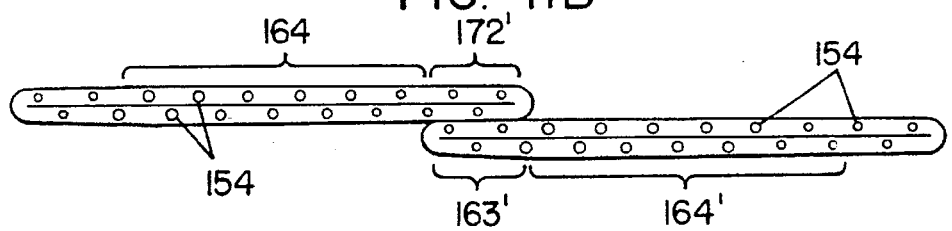
FIGS. 11B through 11E are sectional views each depicting a variation of the braided tapes shown in FIG. 11A.

As shown in FIG. 11B, the unidirectionals in overlapped regions 163' and 172' are smaller than those in the central portions 164' adjacent thereto.

Figure 11C:
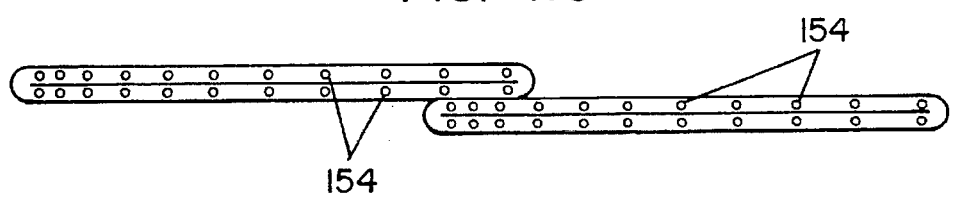

As shown in FIG. 11C, the unidirectionals 154 are all of equal size but unequally spaced apart from one another thus varying the fiber volume in predetermined manner.

Figure 11D:
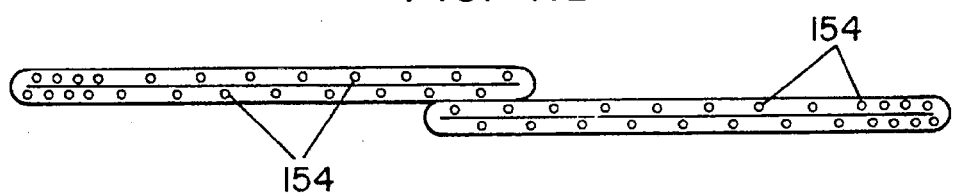

As shown in FIG. 11D, the unidirectionals 154 are of equal size and are concentrated at positions that will correspond to the ID periphery and the OD periphery of the finished preform and friction disc. This construction of a tape layer may be employed to enhance fiber volume and resultant mechanical properties at notched regions to be formed in the inner or outer periphery of the friction disc that are provided to engage corresponding splines or drive lugs for transmission of torque.

Figure 11E:
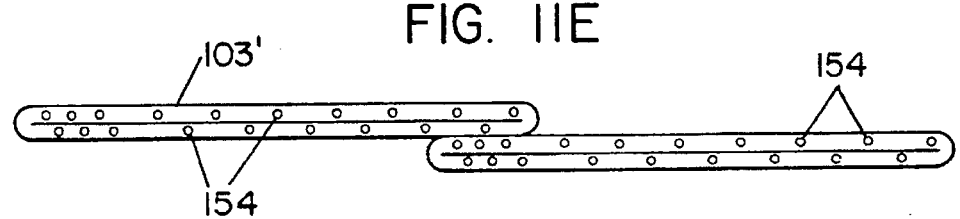

As shown in FIG. 11E, the unidirectionals 154 are of equal size but are unequally spaced from one another, thus varying the fiber volume in predetermined manner. This construction of a tape layer may be formed of two braided tapes that are identical except each has a different radius of curvature.

Having reference to FIGS. 11A, 11B, 11D and 11E, the unidirectionals 154 of the upper layer of each of the collapsed tubular braids are intentionally laterally offset relative to those of the corresponding lower layer to better distribute the fiber contributed by the unidirectionals and facilitate needlepunching. This is in contrast to FIG. 11C in which the unidirectionals are vertically aligned in the upper and lower layers of the tubular braid.

As shown in each of FIGS. 11A, 11B, 11C, and 11E, each of the two associated overlapped braided members is of identical construction having a lesser number of unidirectionals per unit width adjacent its ID periphery than its OD periphery. For each of these constructions only a single type of braid need be produced prior to formation of the preform. In contrast, the construction shown in FIG. 11D requires two braids of different construction to be produced.

Figure 19:
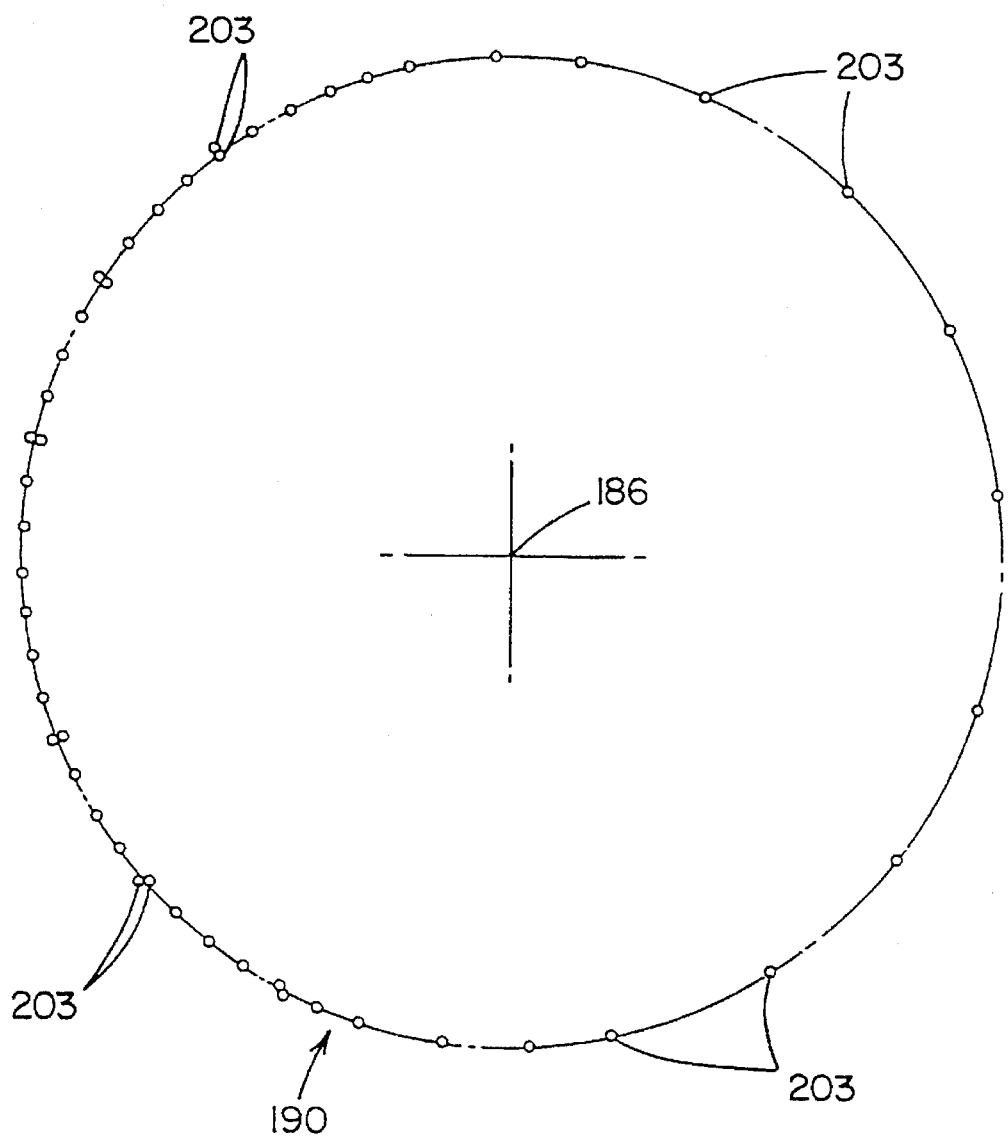
FIG. 19 is a schematic elevational view of a braider depicting certain preferred arrangements of the members to be braided.

While a progression in size of the unidirectionals is shown in FIGS. 11A and 11B, it is also within the invention to use an array in which all of the unidirectionals are of the same size but their spacing is varied in a predetermined manner as they are introduced into the braid as it is being formed such as is shown in FIGS. 11C, 11D and 11E. As shown in FIG. 19, unidirectionals 203 may be arranged in the creel 190 (shown in FIG. 15) asymmetrically around the axial centerline 186 of the braider 180 to produce a braid such as braid 103' shown in FIG. 11E. This is a preferred approach because it avoids the need and expense of manufacturing and stocking unidirectionals of varying size. It is also within the invention to concurrently employ variations in size, spacing, tension and material of the array of unidirectionals. Some or all of the unidirectionals may be of different material than the members introduced by the carriers of the braiding machine. Unidirectionals of different materials than are used for the remainder of the members forming the braid may facilitate manufacture and benefit final mechanical or other properties of the needlepunched and densified structure. Such materials of the unidirectionals could include other carbon-based and/or ceramic-based fibers.

In the embodiment shown in FIGS. 10 and 11, the preform disc 100 comprises one or more helical turns 101 symmetrical about axis 99 of flattened, partially overlapped parallel braids 102, 103 formed of tows 12 of OPF which are thereafter needlepunched together. The laterally adjacent selvedges 156, 157 of the braids 102, 103 are overlapped. When finished, preform disc 100 is similar in appearance to that of friction disc 10 illustrated in FIG. 1. In a manner similar to that illustrated in FIG. 7, one or more additional helically wound fibrous tapes (not shown in FIG. 10) may be interleaved with parallel braids 102, 103 to form a flat annulus having a plurality of interleaved fibrous layers prior to needlepunching. Each tape may be formed by collapsing a helical tubular braid.

Figure 12:
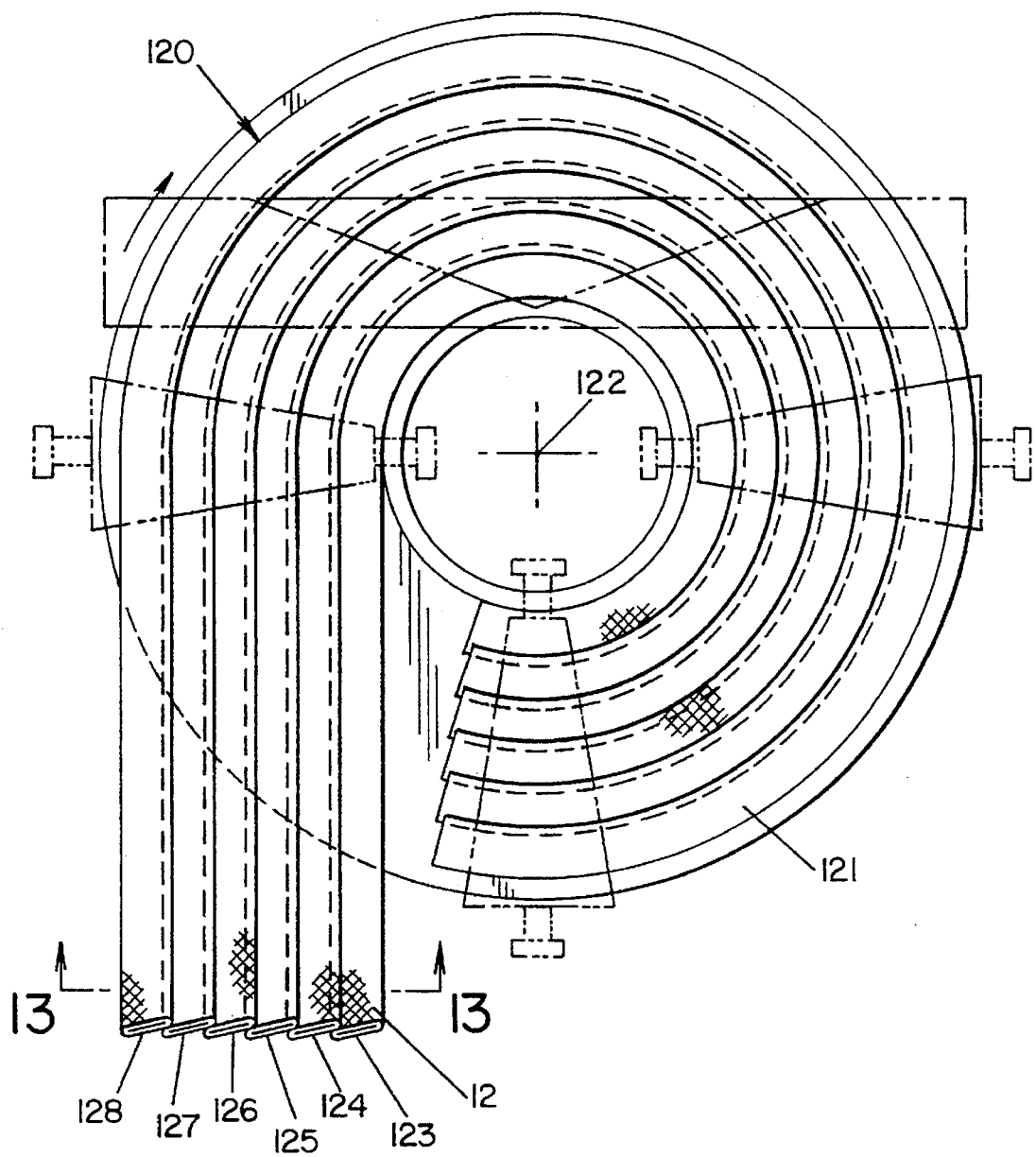
FIG. 12 is a schematic plan view of an embodiment of a preform according to the invention formed from a plurality of parallel overlapped braids.
Figure 13:
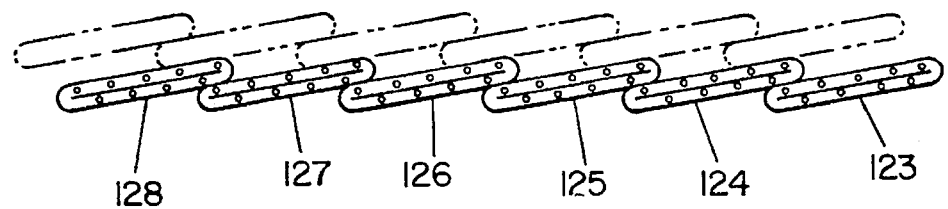
FIG. 13 is a sectional schematic view taken along line 13—13 of FIG. 12.

In the embodiment shown in FIGS. 12 and 13, the preform disc 120 comprises one or more helical turns 121 symmetrical about axis 122 of a plurality of flattened, partially overlapped, parallel braids 123, 124, 125, 126, 127, 128 formed of tows 12 of OPF which are thereafter needlepunched together. Each braided tape may be formed by collapsing a helical tubular braid. When finished, the friction disc resulting from preform disc 120 is similar in appearance to that of friction disc 10 illustrated in FIG. 1. In a manner similar to that illustrated in FIG. 7, one or more additional helically wound fibrous tapes (not shown in FIG. 12) may be interleaved with the helix formed of parallel braids 123, 124, 125, 126, 127, 128 to form a flat annulus having a plurality of interleaved fibrous layers prior to needlepunching.

Because the width and hence radial extent of the individual braids 123, 124, 125, 126, 127, 128 used in the manufacture of disc 120 shown in FIGS. 12 and 13 is relatively small compared to the radial distance between the ID periphery and the OD periphery of the flat arcuate shape being formed, the amount of variation in fiber volume from the ID periphery to the OD periphery of any individual braid is small compared to the variation that naturally occurs when a single curved braid spans the same radial amount which is about five to about seven inches for a typical large commercial aircraft brake friction disc. For this reason, individual braids 123 through 128 need not include unidirectionals that are arranged to compensate for such changes in relative unit fiber volume due to induced curvature. However, the inclusion of unidirectionals is recommended to enhance stability of the individual braids 123 through 128. These small braids of about one and one quarter to about two inches width can be formed on a conventional tubular braider having forty-eight or more carriers or on a conventional flat braiding machine.

It is to be understood that FIGS. 11A through 11E and FIG. 13 are intentionally distorted for clarity of illustration and that in actual practice, the individual braids will drape at each overlapped region, and further, subsequent to needlepunching, there will be no gaps between or within the vertically stacked layers.

Having reference to FIGS. 10, 11, 12 and 13, an annular preform may be made utilizing a plurality of braids each having a width that is less than the radial distance from the ID periphery to the OD periphery of the annulus being formed. Radially adjacent curved selvedge portions of the braid portions are partially overlapped prior to needlepunching. Such radial overlapping is believed to improve the mechanical properties of the needled preform disc and any friction disc made therefrom. The amount of radial overlap is believed to preferably range from about 10 percent to about 25 percent of the radial extent of an individual braid used in forming the annular preform. To avoid excessive unit fiber volume in the overlapped areas, the unit fiber volume of the selvedge regions of the braids may be reduced relative to that of the remainder of the braid as shown in FIG. 11. Such smaller braids may be made on a braider having fewer carriers than the one hundred forty-four carrier braider previously described for use in making a single radial span braid. For example, a seventy-two carrier braider may be used to produce a tubular braid having a circumference of four inches, corresponding to a flattened width of about two inches.

Figure 20:
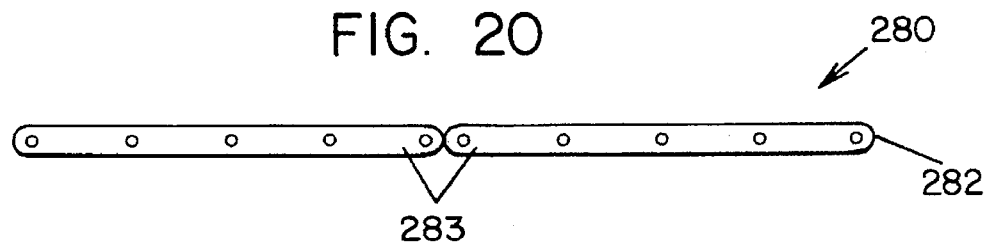
FIGS. 20, 21 and 24 are schematic sectional views respectively of alternate embodiments of preforms according to the invention formed of side-by-side abutted fibrous tapes.

Having reference to FIG. 20, there is shown in cross section an alternate embodiment of a preform 280 comprising a stack of layers of fibrous material. Each of layers 281, 282 has a width generally corresponding to the width of the preform 280. Lower layer 282 is formed of two laterally adjacent (side-by-side abutted) fibrous tape portions 283 whose selvedges are abutted. A Preform of greater thickness can be made by repeating the illustrated pattern as successive layers are joined by needlepunching as they are stacked to the desired height.

Figure 21:
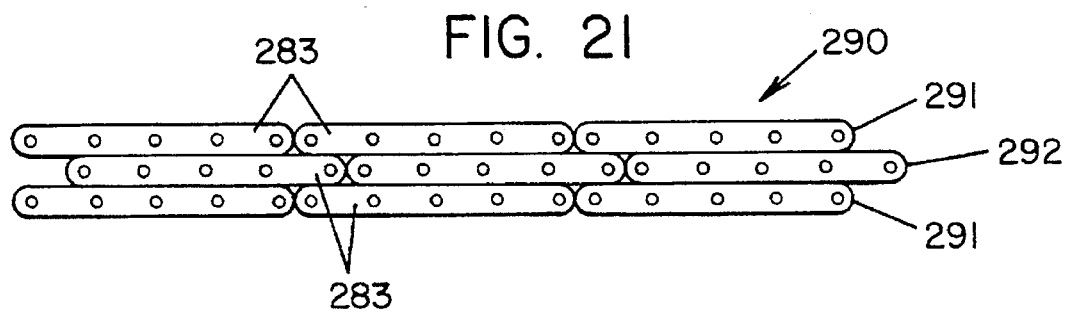

In FIG. 21 there is shown in cross section an alternate embodiment of a preform 290 comprising a plurality of vertically stacked layers of fibrous material. Each of layers 291, 292 has a width generally corresponding to the width of the preform 290. Each of layers 291, 292 is formed of a plurality (three are illustrated) of laterally adjacent (side-by-side abutted) fibrous tape portions 283 with their selvedges abutted. Layer 292 is offset laterally relative to the immediately preceding and the immediately succeeding layers 291 such that the abutted selvedges of the fibrous tapes 283 are not vertically aligned. Preforms of greater thickness can be made by sequentially stacking layers 291 and 292 in alternating manner.

Figure 22:
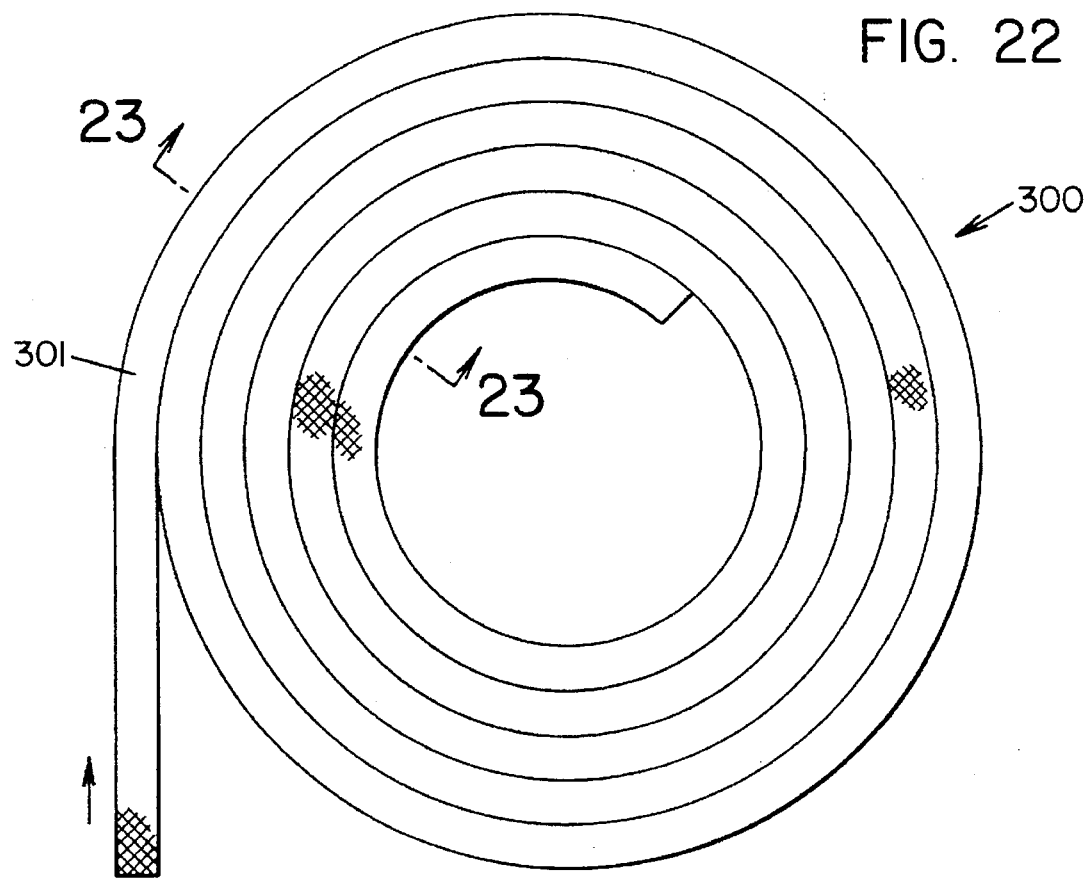
FIG. 22 is a schematic plan view of an alternate embodiment of a preform according to the invention formed of side-by-side abutted fibrous tape portions.
Figure 23:
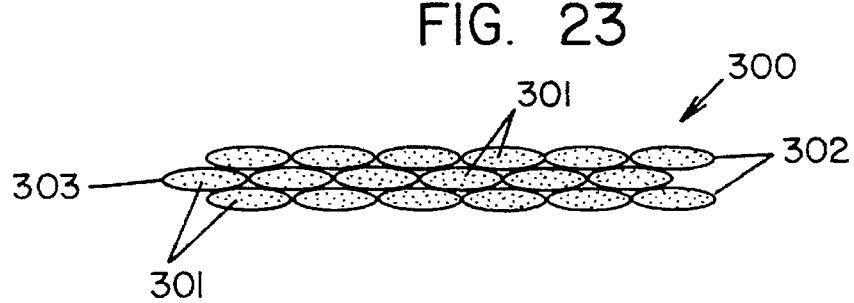
FIG. 23 is a schematic sectional view taken along line 23—23 of FIG. 22.

In FIGS. 22 and 23, there is shown in plan view and sectional view respectively, an annular preform disc 300 comprising a single spirally wound fibrous tape 301. Each layer 302, 303 is formed by spirally winding a fibrous tape 301. Layer 303 is offset laterally relative to the immediately preceding and succeeding layers 302 such that the abutted selvedges of the succeeding turns of the fibrous tape 301 are not aligned in the direction of the height of the stack which corresponds to the thickness of the preform disc 300. Preforms of greater thickness can be made by sequentially stacking layers 302 and 303 in alternating manner.

Figure 24:
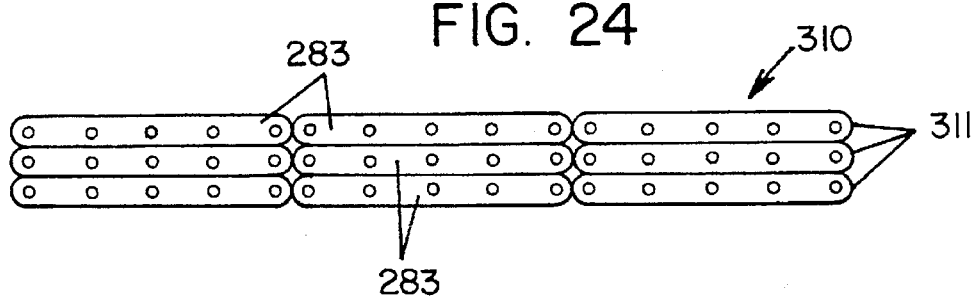

Having reference to FIG. 24, there is shown in cross section a preform 310 comprising a stack of layers 311 each formed of laterally adjacent fibrous tapes 283 having abutted selvedges. Preform 310 is not a preferred embodiment because the abutted regions of fibrous tapes 283 are aligned in the thickness direction of the preform, resulting in low resistance to shearing loads.

In all embodiments in which a fibrous layer is formed of two or more laterally adjacent fibrous tape portions, the overlapped or abutted selvedges of the tape portions may be sewn together prior to needlepunching of the stacked layers. For example, tape portions 283 forming any of layers 291, 292 shown in FIG. 21 may be joined by stitches 284; tape portions 301 forming any of layers 302, 303 in FIG. 23 may be joined by stitches 284. Presewing enables handling of a plurality of laterally adjacent tape portions as though they were a single tape portion of greater width, or if curved, of greater radius. Presewing of spirally wound fibrous tape having abutted selvedges prevents separation of the laterally abutting turns during needlepunching.

MANUFACTURE OF BRAIDED TAPE

A plurality of tows 12 are loaded onto a conventional tubular braiding machine (not illustrated). A simplified version of a conventional Maypole-type braiding machine and its operation are illustrated in U.S. Pat. No. 3,007,497 to Shobert. An eminently suitable braiding machine is available from Steeger of Wuppertal, Germany. In operation of this Steeger machine, the braided material is drawn off through the inside of a forming ring rather than being drawn off the outside of a mandrel. The tows 12 should be tightly wound into uniform packages for use in braiding. Due to the curved nature of the annular shape, i.e. a brake disc such as friction disc 10 to be formed, there inherently occurs a deviation in tow count and correspondingly in fiber quantity per unit area with fiber volume being greatest at the inner periphery 14 and least at the outer periphery 16 of disc 10. The term "count" as used herein in reference to fibrous elements such as tows or yarns forming a fabric means the number of fibrous elements per lineal inch measured perpendicular to the longitudinal direction of the fibrous elements. It is believed that the braid angle of the tows may range from 30 to 50 degrees and is varied based on the number of braid carriers employed, the desired fiber volume, the dimensions of the friction disc to be formed, and thus the dimension or diameter of the tubular braid to be formed prior to flattening and curving it into the shape of the friction disc being formed.

Another manner of expressing the character of a braid is in terms of picks/inch (PPI). For a curved braid formed of 12 k tows and having a nominal ID of 10 inches and an OD of about 20 inches, preferably the ID of the curved braid has about 5 ppi; the OD of the curved braid has about 2.5 ppi. PPI is a complex function of braider speed, fibrous material pull out rate, angle of pull out and width of braid, and is empirically determined. Five PPI means that five crossovers of the members being braided occur per inch of machine direction movement. PPI is conveniently determinable manually as the braid apparatus is empirically adjusted.

As used herein, the term "braid angle" and related forms means the acute angle defined by the tangent to the helix relative to the longitudinal axis of the tubular braid being formed. As illustrated in FIG. 5, tubular braid 50 formed of tows 12 is symmetrical about its longitudinal or braid axis 53. As shown in FIG. 6, tubular braid 50 has a braid angle α of 40°. One repeat of the braid pattern measured along the braid axis 53 is called a "plait". For given braiding members (e.g. 12 k OPF tows), the plait spacing determines the angle $2\alpha$ between two opposite helical sense sets of members of a braid. For a tubular braid having a take-up length of the braid per braid repeat of r and a braid circumference of s, the following relationship can be established:

$$\alpha = \tan^{-1}(s/r)$$

which is equivalent to the standard description of helical angles where the repeat length is equivalent to the cycle length of a helix.

Figure 14:
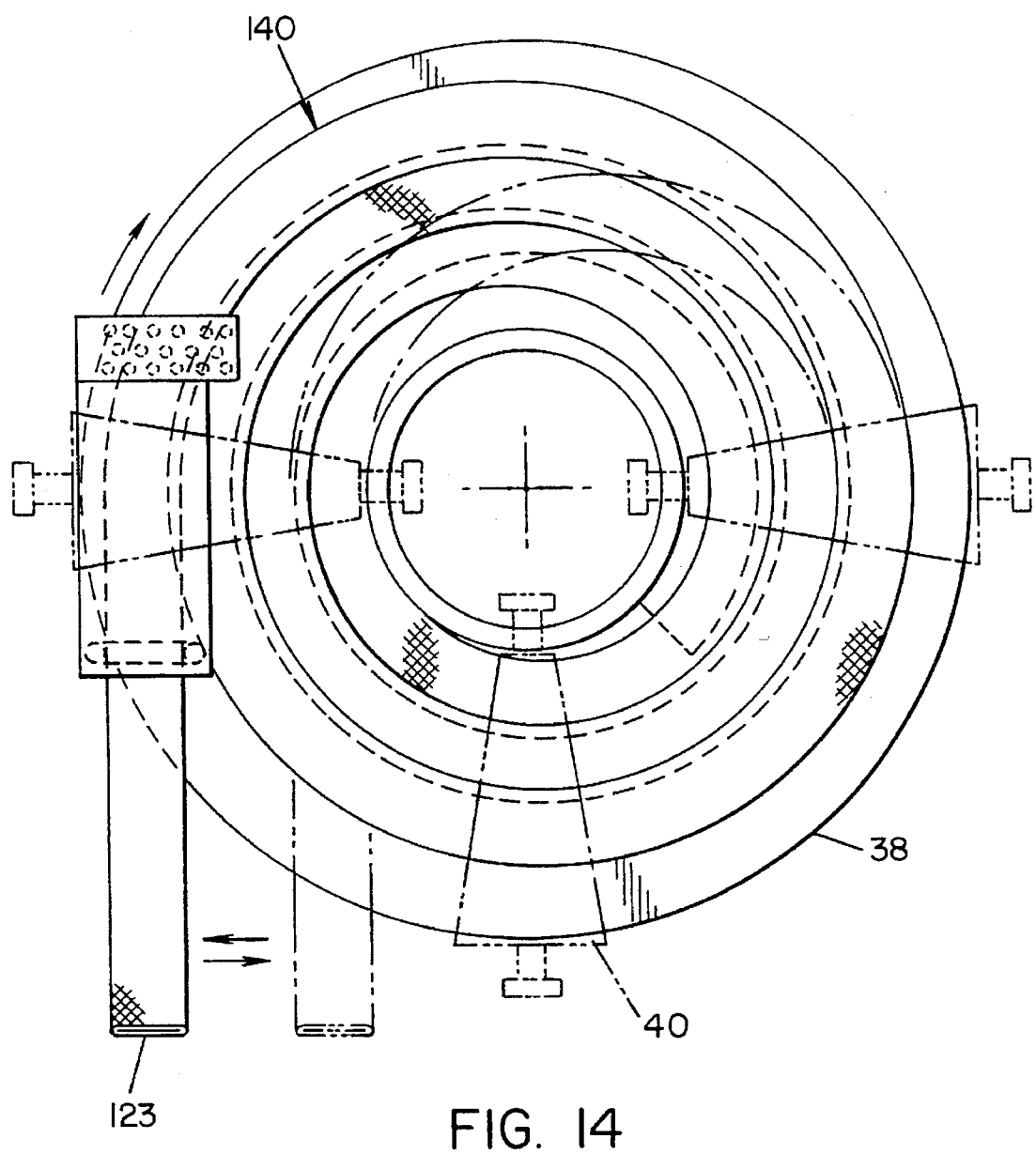
FIG. 14 is a schematic plan view of an embodiment of the invention formed from a single, overlapped, spirally wound braid.

A plurality of braided tapes, each like flattened tubular braid tape 60 shown in FIGS. 6 and 6A or tape 60' shown in FIG. 6B, each of a width corresponding to a portion of the fibrous structure to be formed, are produced. The tapes may be curved to correspond to the shape of the desired preform. Where it is desired to produce a friction disc, the tapes may be formed into an annulus by curving them around a circular shaped center guide or mold such as center mold 91 shown in FIG. 9 and passed through a conventional needle loom. Alternatively, the tapes may be fed into a rotary needle loom as shown in FIGS. 10, 12 and 14. In this instance, each braided tape is of a width less than the radial distance between the ID periphery and the OD periphery of the annulus.

Curving of a straight braid containing unidirectionals not only affects fiber volume, but also creates convolutions because of the differential tension between the ID and OD unidirectionals. These nonuniformities include bunching, span width shrinkage and other related distortions. For these reasons, making the braid as a curved braid is preferred, particularly when the width of the braid is more than about twenty-five percent of the radius to which the braid is to be curved.

MANUFACTURE OF CURVED BRAIDED TAPE

A curved braid may be more accurately formed by a machine rather than manually as was previously done as described in U.S. Pat. No. 5,217,770 to Morris et al.

Suitable apparatus for the manufacture of a curved or helical braid is shown in FIGS. 15 through 19 hereof.

Figure 15:
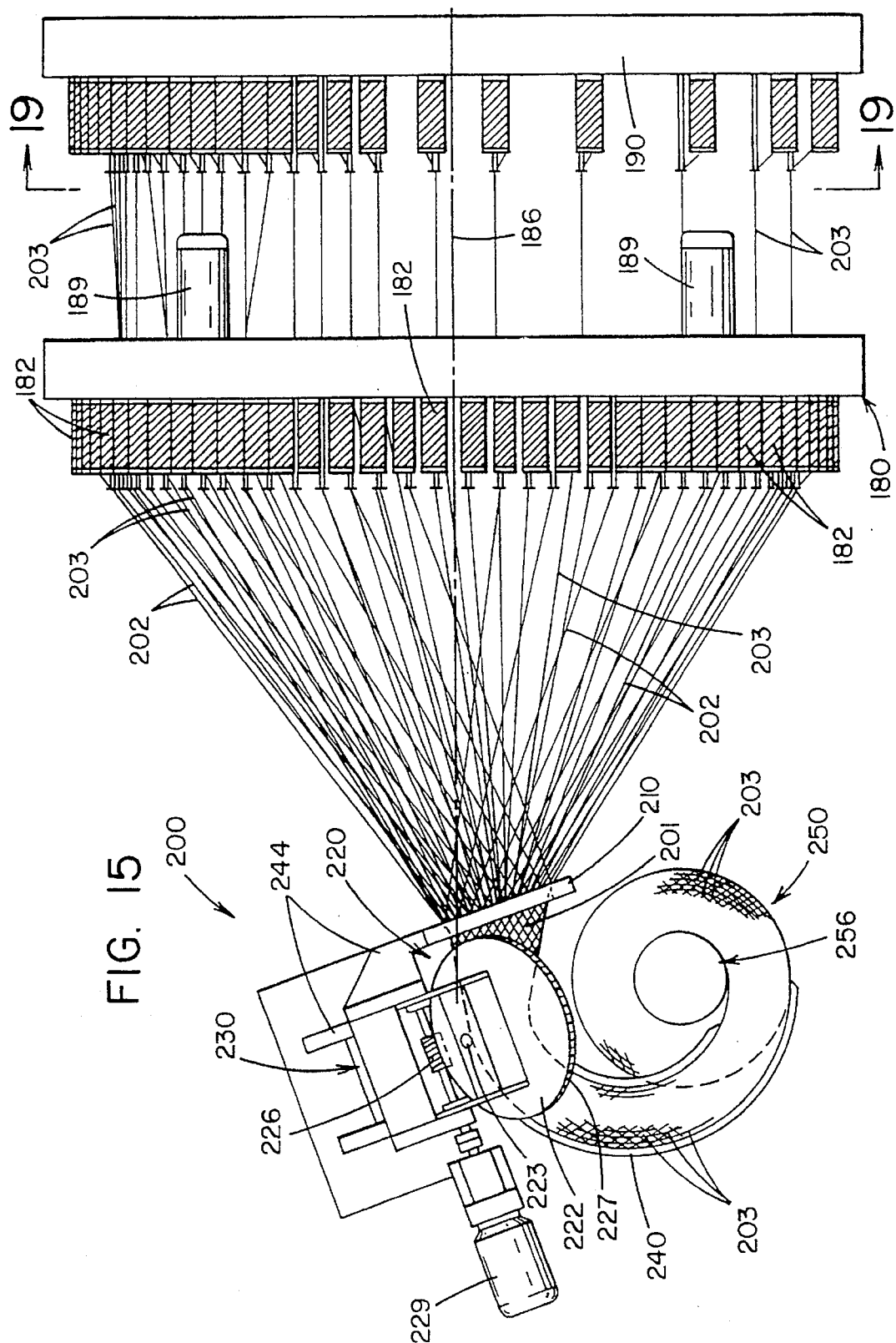
FIG. 15 is a plan view schematically depicting an embodiment of an apparatus for the manufacture of curved braid for use in the invention.

Having reference to FIG. 15 there is shown a curved braid forming apparatus 200. The braiding machine 180 is conventional in design and operation as is the creel 190 containing packages of the unidirectional members 203 to be formed into the curved braid 201. Applicants have employed a one hundred forty-four carrier braider capable of seventy-two additional unidirectional positions uniformly spaced about the circumference of the braider, although it is believed that the invention will work with braiding machines having a greater or lesser number of carriers and unidirectional positions.

Apparatus 200 for forming curved or helical braid 201 comprises a forming ring 210 through which the fibrous members 202, 203 being braided are drawn from the braiding machine 180 and creel 190 by pull-out apparatus 220 into the nip 224 of a pair of juxtapositioned frustoconical rolls 222 that are synchronously driven. The frustoconical rolls 222 are preferably identical. Means 230 are provided to adjust the gap or nip 224 between the juxtapositioned frustoconical rolls 222 and to exert a predetermined amount of pressure on the braid 201 passing between the juxtapositioned frustoconical rolls 222. The frustoconical rolls 222 are synchronously driven by a single worm gear 226 the teeth of which engage complementary teeth 227 encircling the larger base end surface of each frustoconical roll 222. A compound curved chute 240 provided at the output of the nip of the frustoconical rolls 222 guides the curved braid 201 as it forms onto a take-up package 256. The apparatus 200 includes a rotatable take-up 250 which in certain preferred embodiments is synchronized relative to the speed of the frustoconical pull rolls 222 and speed of the braider 180. In its simplest form the take-up 250 comprises a motorized vertical screw 251 whose pitch corresponds to the thickness of the flattened curved braid 201 being formed such that a bottom flanged bobbin 256 mounted on the take-up 250 is lowered per revolution an amount corresponding to the thickness of the braid 201 being wound thereon.

As shown in FIG. 15, the plane of the forming ring 210 and the plane within which the axles 223 about which the respective frustoconical rolls 222 rotate are parallel and are positioned at a common angle α relative to the axial centerline 186 of the braider 180. Additionally, the pull roll apparatus 220 is offset laterally relative to the centerline 186 of the braider 180. As seen in FIG. 15, angle α is about 20 degrees and the offset is toward the right edge of the braider 180 when viewed from the takeup apparatus 250. The nip 224 of the frustoconical rolls 222 is positioned on centerline vertically relative to the vertical center of the braider 180. The curved braider apparatus 200 additionally includes a compound curved chute 240 which aids in transferring the curved braid 201 being formed into a motor-driven take-up apparatus 250.

Figure 17:
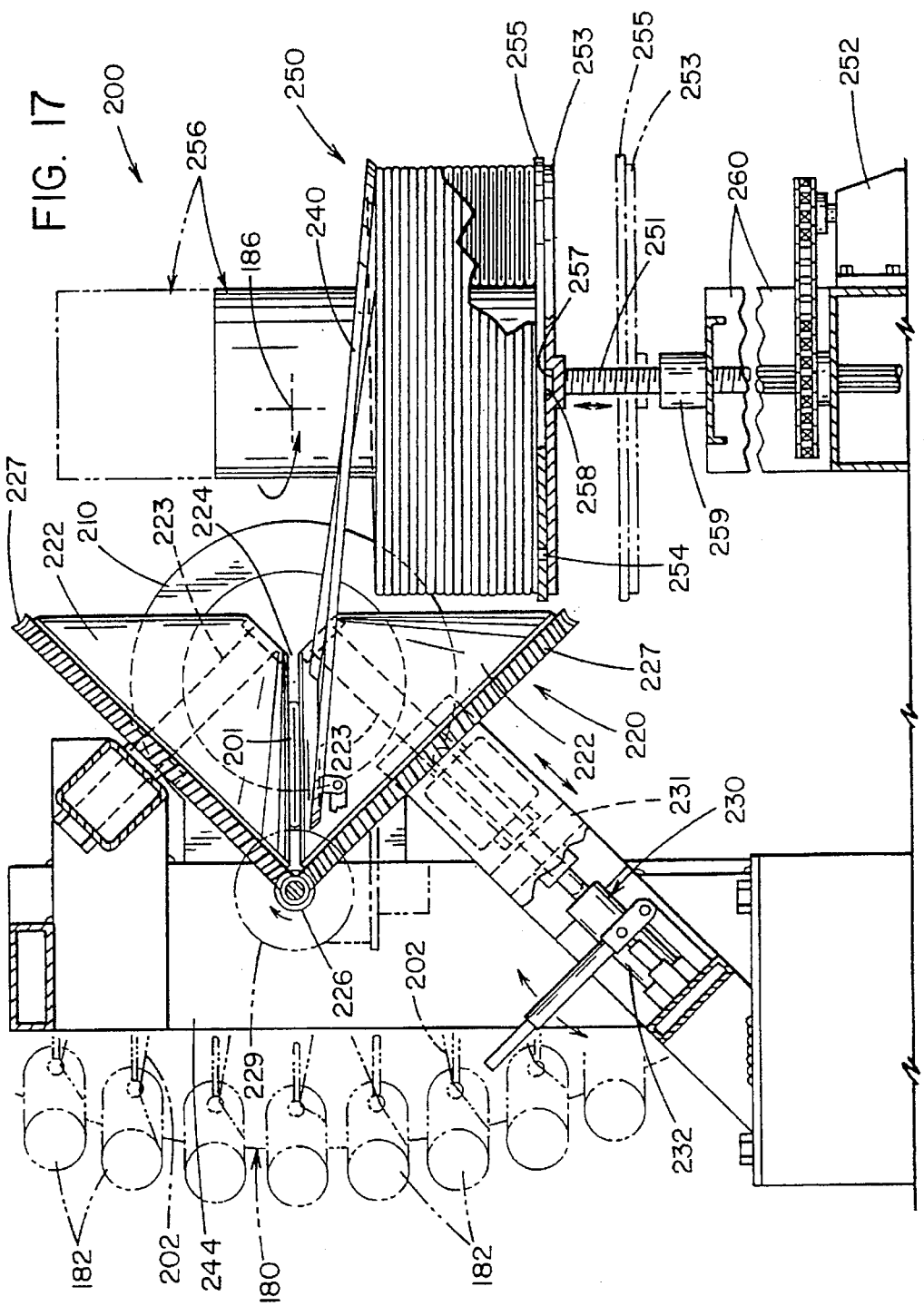
FIG. 17 is an end view taken on line 17—17 of FIG. 16 of an embodiment of the curved braid manufacturing apparatus schematically depicting means for driving the juxtapositioned frustoconical pull rolls, and means for adjusting the gap between the frustoconical rolls, and means for adjusting their nip pressure.
Figure 18:
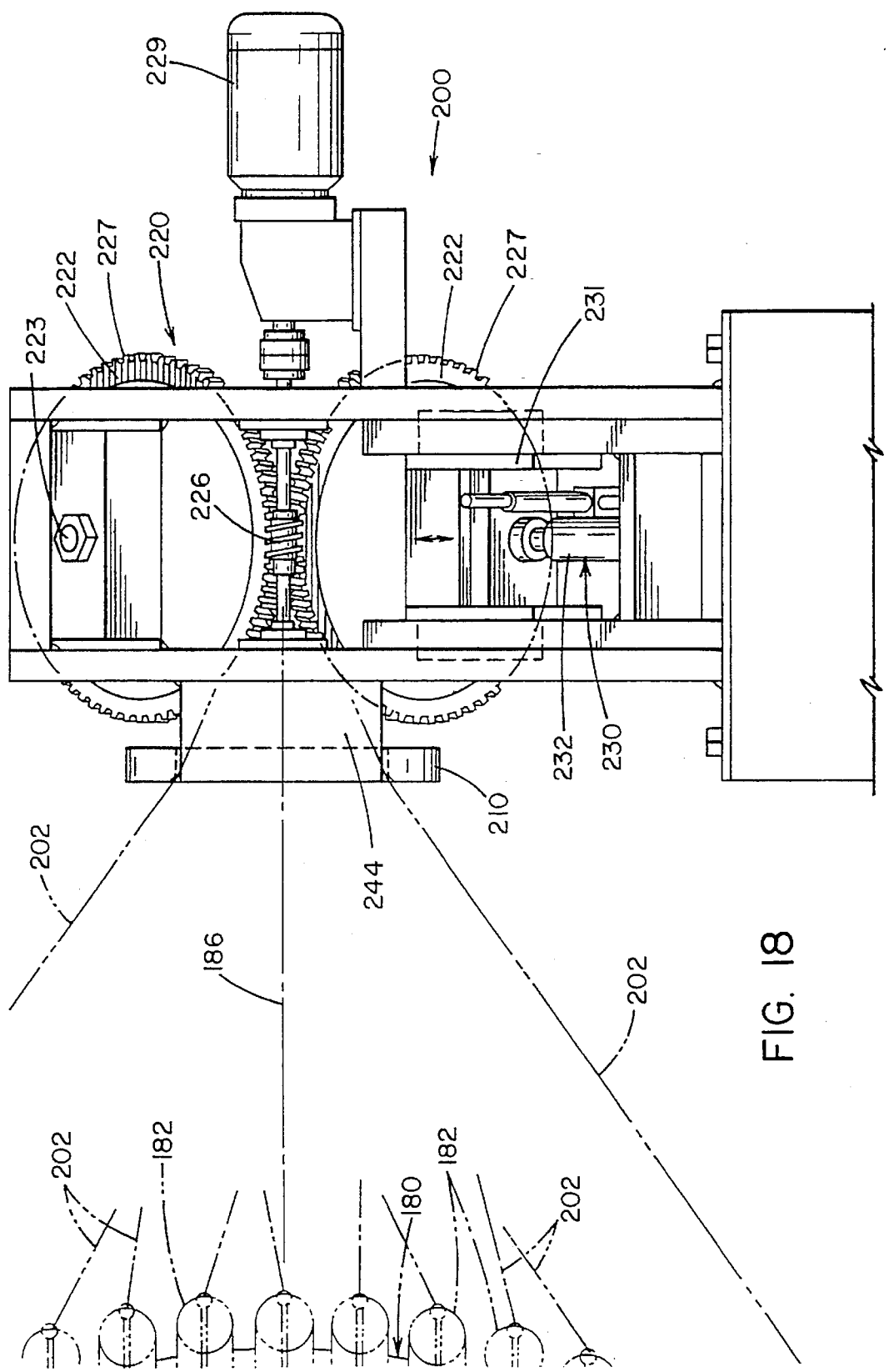
FIG. 18 is a schematic elevational view taken on line 18—18 of FIG. 16.

As seen in FIG. 17, the take-up apparatus 250 includes a motorized screw 251 which in certain embodiments is driven synchronously by motor 252 in known manner through electrical interconnections (not illustrated) with the motor 229 driving the frustoconical pull rolls 222 and the motor or motors 189 driving the braider 180. Screw 251 is rotatably fitted through stationary nut 259 secured to subframe 260. As screw 251 is rotated relative to nut 259 it lowers the bobbin 256 on which the curved braid 201 is taken up. The top of the screw 251 is provided with a flange member 253 having a vertically projecting pin 254 for engagement with a complementary aperture provided in the bottom flange 255 of the top hat-shaped bobbin 256 onto which the curved braid 201 is wound. Flange member 253 is also provided with a central recess 257 for receipt of the central hub 258 projecting from the bottom of the flange 255 of bobbin 256. Engagement of hub 258 with recess 257 centers the bobbin 256 on the flange member 253.

The frustoconical pull rolls 222 may be identical. They may be formed of cast iron that is machined to provide a frustoconical surface. The included angle of the truncated right circular cone of each frustoconical roll 222 is preferably from about sixty (60) to about ninety (90) degrees for the manufacture of precurved braided material suitable for use in the manufacture of friction discs for use in a multi-disc brake similar to that shown and described in U.S. Pat. Nos. 4,018,482; 4,878,563; and 4,613,017. Increasing the included angle will increase the surface speed differential between adjacent points along the line of contact of the frustoconical pull rolls 222. This area of contact with the material being braided may also be referred to as the nip 224 of the juxtapositioned frustoconical rolls 222. A greater included angle within each frustoconical roll 222 results in greater surface speed differential between the tip end of the cone and the base of the cone and thus shorter radii of the curved braid 201 when other factors are equal. It has been found, however, that a ninety degree included angle of each frustoconical roll 222 is sufficient to provide the range of precurved braids desired for use in manufacturing aircraft friction disc preforms having an outside diameter of about 24 inches and an inside diameter of about 10 inches, and multiple sets of different frustoconical pull rolls have not been found to be necessary for the desired range of curved braids. The size of the pull rolls must be great enough to present a line of contact between them that is at least as long as the flattened braid is wide. The width of a braid may be defined as the distance between the lengthwise extending, laterally spaced first and second edges of the braid. For a typical commercial aircraft brake disc preform formed by helically coiling and needlepunching a single curved braid which spans the entire radial distance of the preform, this dimension may be from about 4 to about 8 inches. Where multiple narrower curved braids are utilized as in the present invention, this dimension may be less, typically not exceeding from about 2 to about 4 inches. For the embodiment shown in FIGS. 12 and 13, this dimension would be about 2 inches.

Each frustoconical pull roll 222 is rotatably supported about a axle 223 congruent with the axis of symmetry of the respective frustoconical roll. The longitudinal axes of the pair of axles 223 lie in a common vertical plane and are positioned such that they intersect at an angle such that the facing surfaces of the frustoconical rolls 222 form a parallel horizontal nip 224 or line of contact. The base periphery of each frustoconical roll 222 is provided with gear teeth 227 which complement those of worm gear 226 driven by motor 229. The frustoconical pull rolls 222 are thus synchronously driven at the same rotational speed and at substantially the same surface speed at corresponding facing positions along the nip 224 such that their facing surfaces which contact the fibrous members 202, 203 are at nominally the same surface speed.

Figure 16:
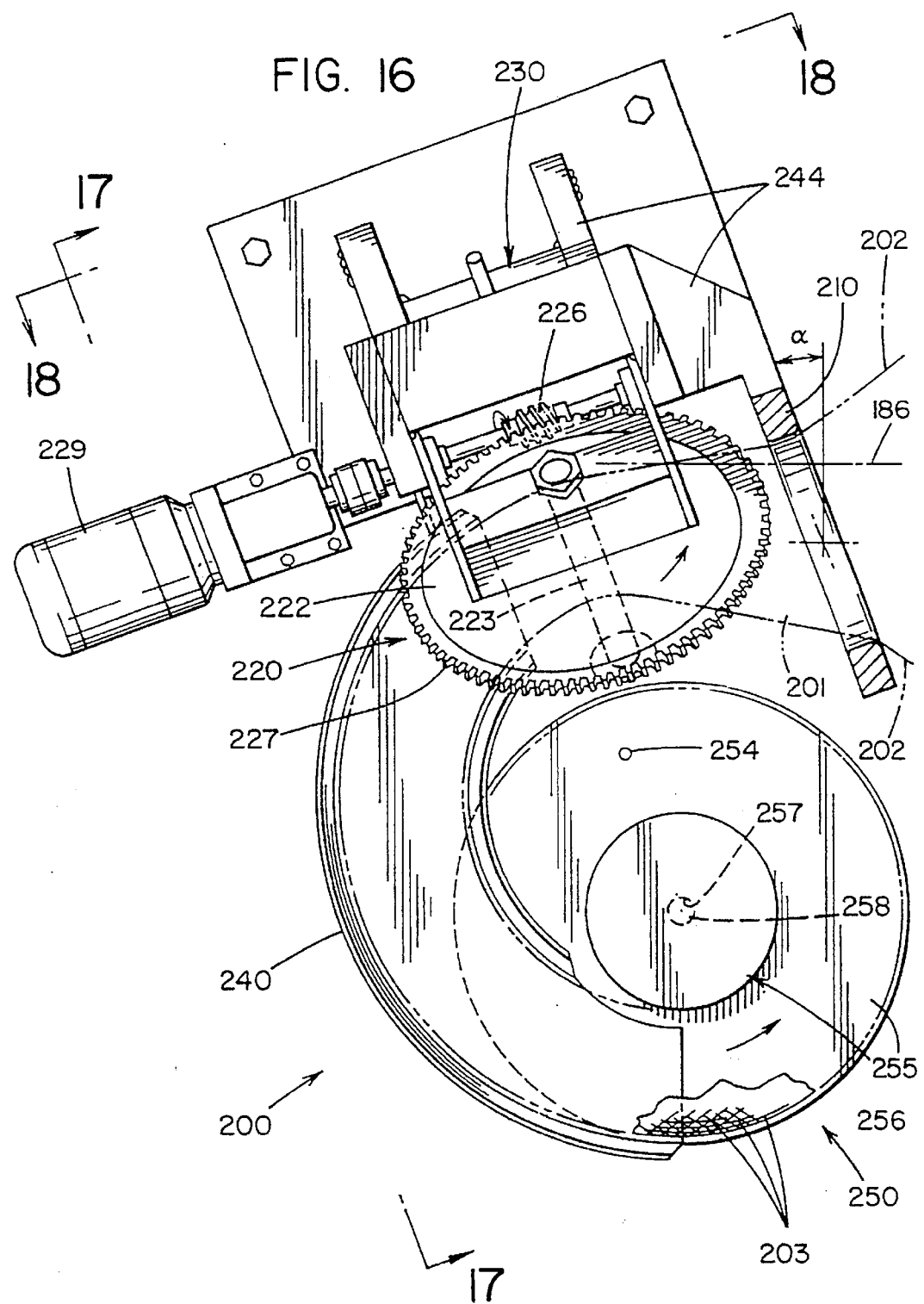
FIG. 16 is an enlarged plan view schematically depicting an embodiment of pullout apparatus and an embodiment of braid take-up apparatus shown in FIG. 15.

The lower pull roll 222 is movable to adjust the gap or nip 224 between the lower and upper frustoconical pull rolls 222. As shown in FIGS. 16 and 17, the axle 223 supporting lower frustoconical pull roll 222 is mounted on reciprocal means 230 for moving it toward and away from the upper frustoconical pull roll 222. The reciprocal means 230 may comprise a movable frame 231 connected to a hydraulic jack 232 as shown or a pneumatic load cylinder (not illustrated) to move the frame 231 and thus the lower frustoconical pull roll 222 toward and away from the upper frustoconical pull roll 222. The manner of adjustment of the nip 224 is preferably such that the lower frustoconical pull roll 222 is movable along a straight path which maintains near constant full depth engagement of the teeth 227 of the lower frustoconical pull roll 222 with the teeth of worm drive gear 226.

The forming ring 210 is positioned between the frustoconical pull rolls 222 and the braider 180. The forming ring 210 may be made of aluminum. The inlet side of the center aperture of the forming ring 210 is radiused or flared out toward the braider 180 and polished to minimize abrasion of the fibrous members 202, 203 to be drawn therethrough during the braiding operation. The forming ring 210 is rigidly mounted relative to the braider 180 and the frustoconical pull rolls 222. This may be conveniently achieved by affixing the forming ring 210 to a subframe that is rigidly attached to the frame 244 to which is mounted the frustoconical pull roll apparatus 220 and the take-up apparatus 250. The preferred inside diameter of the forming ring 210 must be determined empirically. If it is desired to form a wider flattened curved braid, a larger inside diameter forming ring is preferably employed, and vice versa.

As seen in FIG. 15, the entire frame 244 is angled relative to the axial centerline 186 of the braider 180. The nominal angle is about 20 degrees for formation of the curved braid described above. Increasing this angle results in decreasing the radius of the resultant curved braid to be formed and conversely, decreasing this angle results in increasing the radius of the resultant curved braid to be formed. Increasing the distance between the forming ring 210 and the braider 180 results in greater number of picks per inch or crossover points of the members 202, 203 being braided and conversely, decreasing the distance between the forming ring 210 and the braider 180 results in lesser number of picks per inch of the members being braided. Increasing the number of picks per inch will necessarily increase the braid angle and vice versa when all other factors are held constant.

Use of the aforedescribed curved braid apparatus 200 is as follows. All one hundred forty-four carriers 182 of the braider 180 are filled with members 202 of fibrous material to be braided, e.g. oxidized PAN tow. Selected braider positions are also provided with unidirectionals 203 from the creel 190. As is illustrated in FIG. 19, a greater number of unidirectionals 203 may be provided at circumferentially spaced apart positions of the braider 180 which correspond to the outer diameter or larger radius periphery of the flattened curved braid 201 to be formed. Unidirectionals 203 may be doubled up at certain positions corresponding to nearer the outer larger radius periphery of the curved braid 201 to assist in achieving a curved braid 201 having the desired predetermined fiber volume at the corresponding location. These unidirectionals 203 also contribute to the stability of the braid 201 during windup and any subsequent processing. All of the members 202, 203 to be braided are manually drawn through the forming ring 210 and the nip 224 of the frustoconical pull rolls 222. The lower pull roll 222 is then raised towards the upper pull roll 222 to decrease the gap of the nip 224 and to apply pressure to the fibrous members 202, 203 in the nip. The entire apparatus is then energized causing the braider 180 to begin operation and the pull rolls 222 to operate in synchronism therewith. When braided material 201 extends a short distance aft of the nip 224 of the frustoconical pull rolls 222, the unbraided fibrous material is cut away. The curved flattened tubular braid 201 slides down chute 240 and is helically wound onto the take-up bobbin 256. When the take-up bobbin 256 is full, the braiding operation is stopped, the curved braid 201 is severed, and the full bobbin 256 is removed from the take-up mechanism 250. The screw 251 of the take-up mechanism 250 is returned to its original full height and an empty bobbin 256 is installed such that the drive pins 254 projecting upwardly from the flange 253 of the take-up mechanism 250 are in engagement with the complementary apertures in the bottom flange 255 of the tophat bobbin 256, which apertures also serve to center the tophat bobbin 256 on the take-up mechanism 250 and to provide a driving torque for take-up of the curved braid 201 as it is formed. Braiding operations are then resumed.

The curved braid apparatus may vary from that aforedescribed. Examples of such variations follow. The angle of the forming ring 210 and frustoconical pull roll mechanism 220 relative to the centerline 186 of the braider 180 should be reduced if it is desired to provide a curved braid 201 having a larger radius of curvature. Applicants have found that the 20 degree angle illustrated and described herein is suitable for the manufacture of a curved flattened tubular braid having an inside diameter of about 10 inches and an outside diameter of about 24 inches. The forming ring 210 positioned between the braider 180 and frustoconical pull rolls 222 directs the unbraided members 202, 203 to be braided as they are drawn from the braider carriers 182 and filamentary packages 192 creel 190 to a common forming or conversion point at or near the nip 224 of the forming rolls 222.

For flexibility and convenience of operation the control system is preferably provided with electrically interconnected drive motors. The drive motor or motors 189 of the braider 180 can be controlled by a first potentiometer (not illustrated), the motor 229 of the frustoconical pull rolls 222 by a second potentiometer (not illustrated), and the motor 252 of the tophat bobbin 256 take-up mechanism 250 by a third potentiometer (not illustrated). After the speeds of the various drive motors 189, 229 and 252 are relatively adjusted such that the desired braid is being formed, the master speed controller (not illustrated) can be adjusted upward or downward to increase or decrease the overall speed of curved braid manufacture without affecting the characteristics of the braid being formed. Also, individual motors can be jogged to facilitate loading, doffing and maintenance of the apparatus. Higher braider speed relative to the speed of the pull rolls 222 results in a greater number of crossovers or picks per inch, and conversely lower braider speed relative to pull roll speed results in a lower number of crossovers or picks per inch. Because the braid 201 is curved, the number of picks per inch necessarily varies between the inside diameter periphery and the outside diameter periphery of the braid, the outside diameter periphery having less picks per inch at all times, inversely in proportion to the amount of curvature. In contrast, a straight flattened tubular braid has the same number of picks per inch at each peripheral edge.

No special surface treatments are necessary for the frustoconical pull rolls 222 when formed of machined (milled) iron castings. The use of elastomeric coatings or covers on the frustoconical pull rolls 222 is not necessary nor recommended because the relatively high pressure at the nip 224 may result in dislodging or tearing of such covers. Sufficient frictional pulling force is obtained merely by squeezing the braid 201 between the frustoconical rolls 222.

EXAMPLE 1

Formation of Curved Braid

A curved braid having an inside periphery radius of about 13 cm (5 inches) and an outside periphery radius of about 30 cm (12 inches), was made employing the following setup parameters that were empirically determined to be suitable. A forming ring having an inside diameter or aperture of about 29 cm (11.5 inches), which corresponds to about two times the width of the flattened curved braid to be formed was found to be suitable. Ring 210 was positioned about 1.5 m (56 inches) from the braider 180. Ring 210 was positioned about 25 cm (10 inches) from the pull roll nip 224. The forming ring 210 and vertical plane defined by the pull roll axles 223 were angled about twenty degrees relative to the axial centerline 186 of the braider 180. The apparatus was provided with frustoconical pull rolls each having an included angle of ninety degrees.

FORMATION OF ANNULAR PREFORM

One or more layers of a flattened tubular braid are joined to one another and/or to one or more other fibrous layers superposed thereon by needlepunching. This may be accomplished by passing the superposed layers in a mold or jig such as jig 90 to and fro through a conventional needlepunch loom such as a conventional needlepunch loom (not illustrated but exemplified by U.S. Pat. No. 2,930,100 to E. C. Rust, Jr).

Figure 3:
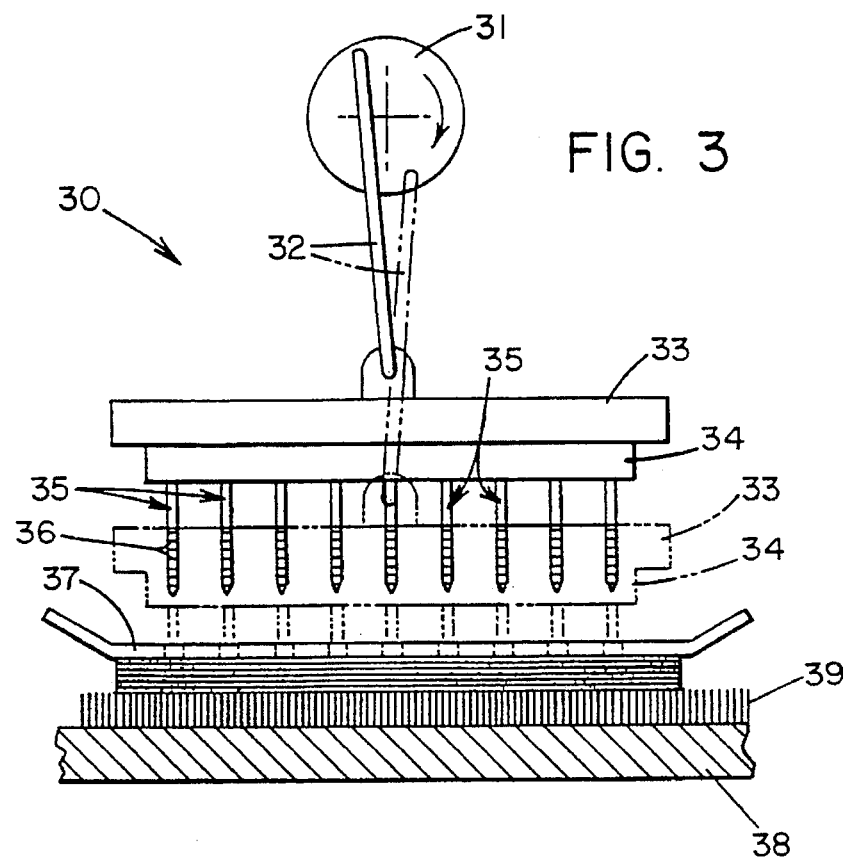
FIG. 3 is an isometric schematic view of a rotary needle loom.
Figure 4:
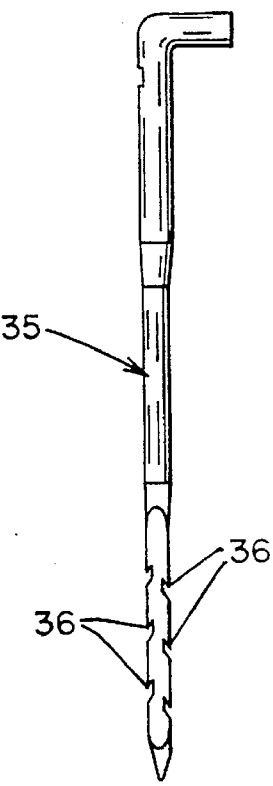
FIG. 4 is an enlarged schematic depiction of a representative needle used in the needle loom of FIG. 3.

Alternatively and preferably, the braids may be needled into a unitary preform structure as they are fed continuously onto a rotating support. Preferably, this is accomplished using a rotary needlepunch loom such as rotary loom 30, a portion of which is illustrated schematically in FIG. 3, other features of which are shown in FIG. 10. Loom 30 includes rotatable crank 31, connecting rod 32, reciprocable platen 33, needle board 34, needles 35, stripper plate 37, and rotatable bed plate 38. Rotation of crank 31 effects reciprocating motion of platen 33, causing needles 35 of needleboard 34 to reciprocally move through stripper plate 37 toward and away from bed plate 38. The fibrous layers to be joined to one another are passed between stripper plate 37 and bed plate 38 while reciprocating motion of the needleboard 34 causes needles 35 to penetrate the fibrous layers. The barbs 36 of needles 35 effect cross-linking of the layers by displacing fibers/filaments out of the layers in a direction generally perpendicular to the faces of the layers. Bed plate 38 is arranged for rotation of the fibrous layers carried on its bristle brush 39 through the zone of operation of the reciprocable needles. Also provided is a means for adjusting the distance between the bottom of the stroke of the needles and the bed plate 38. This may be accomplished by changing the stroke of the needles raising the entire drive mechanism for the needles relative to the bed plate, by lowering the bed plate relative to the needle drive mechanism, or by a combination of any of the foregoing means. The fibrous tapes being introduced into the rotary needle loom are guided and held in position by conical rolls 40. An example of a rotary bed needle loom is described in DE 2911762 to Dilo. This machine may be modified to introduce of a fibrous strip in a spiral pattern with or without overlap of the selvedges of the fibrous strip. The needling head follows the movement of the fibrous strip and thereby avoids overneedling of the preform being made.

In the following examples embodiments of carbon-carbon friction discs according to the invention and their preparation according to the invention are described. The invention, however, is not to be construed as being limited to the particular embodiments set forth in the following examples.

EXAMPLE 2

Annular Preform From Two Curved Braids

Curved braid A having an approximate ID of 10.5 inches and an approximate OD of 18 inches, and curved braid B having an approximate ID of 16.5 inches and an approximate OD of 24 inches are prepared and wound onto separate tophat bobbins. Braid A and braid B are radially overlapped in amount of about 1.5 inches as they are helically introduced into a rotary needle loom where they are joined by needlepunching.

EXAMPLE 3

Annular Preform From Two Identical Braids

A conventional tubular braider is arranged to produce a 2×2 curved braid of about ten inches circumference (five inch wide flattened width) having a braid angle of forty (40) degrees at the midpoint of width of the braid. Tension of all of the carriers is set to the same value throughout the braiding operation. As the tubular braid is being formed, it is pulled off through the forming ring and flattened by the frustoconical pull rolls and coiled into a continuous helical tape on tophat bobbin 256. A pair of braids are uncoiled from separate tophat bobbins 256 and fed continuously in side by side arrangement into an axial rotary needlepunch loom. The pair of laterally adjacent braids are partially overlapped in the amount of about twenty-five percent of the individual braid width as they are fed onto the rotating bed of the loom. The rate of feed of the helical braid is synchronized to the rate of rotation of the rotary support bed of the loom. Upon reaching the desired thickness of about two inches, the feed braids are severed and the completed preform is removed. The resulting preform has an OD of about 63.5 cm (25 inches) and an ID of 25.4 cm (10 inches). No die punching is believed to be necessary as the resultant preform should be near net shape.

Figure 9:
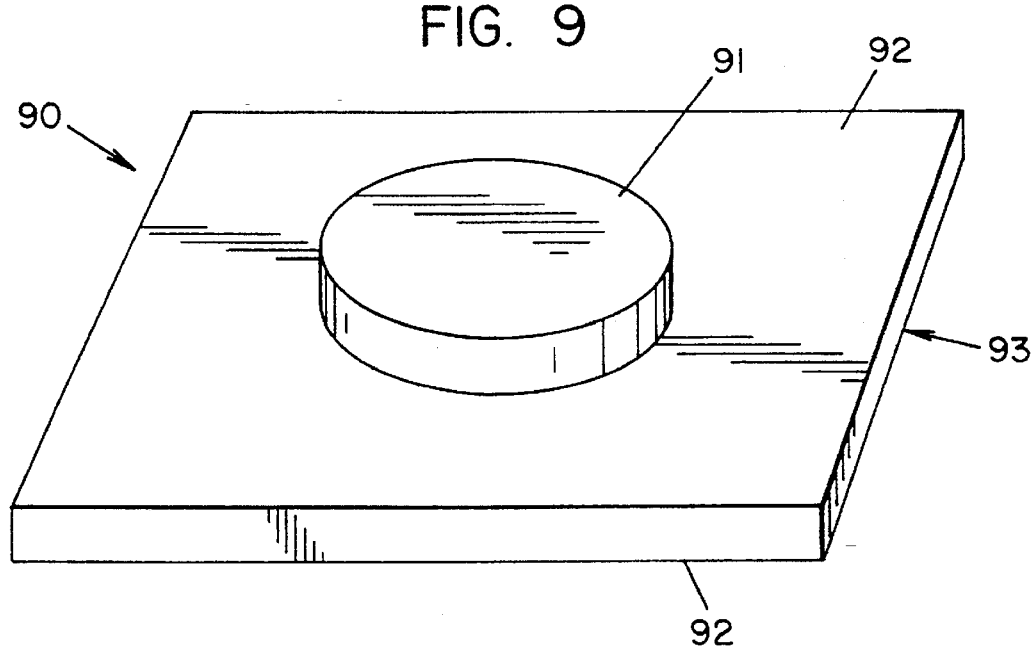
FIG. 9 is an isometric view of a jig for use in practicing the invention.

If no rotary loom is available, a supporting jig 90 similar to that shown in FIG. 9 is fabricated and utilized in needlepunching the annularly wound layers of fibrous tape on a conventional needle loom. The use of jig 90 is less desirable than use of a rotary needle loom because the fibrous tapes can not be fed continuously onto jig 90 as it is passed to and fro through a conventional reciprocal needle loom. Briefly, the jig 90 comprises an annular center mold 91 secured to one of the large flat surfaces 92 of a flat transport board 93. The transport board 93 is used to enable passing helically or spirally wound layers of fibrous tape through a conventional needlepunching loom such as that illustrated in FIG. 3. The center mold 91 keeps the fibrous layers from being excessively distorted while needlepunching.

The transport board must provide a dimensionally stable, firm support for the fibrous layers as they are passed through the needlepunch loom. The transport board must be of a thickness and composition which may be penetrated by the needles of the needlepunch loom without damage to them. A suitable transport board 93 may be fabricated by needlepunching together a plurality of layers of PAN or OPF tow material or equivalent. A transport board having a total thickness of about ½ inch formed of layers of PAN or OPF tows is believed to have adequate stiffness and other properties for the preparation of shaped fibrous structures according to the invention.

An annular center mold 91 having a diameter slightly less than that of the friction disc preform to be manufactured and a thickness of about ⅜ inch is attached to the transport board to complete the needlepunching jig. The center mold 91 may be formed of neoprene elastomeric material, needlepunched layers of PAN or OPF tow or equivalent material. The center mold 91 may be attached to the transport board 93 with a suitable adhesive such as Camie 363 Fastac available from Camie-Campbell, Inc. of St. Louis, Mo. If the center mold 91 is formed of fibrous material, it may be attached to the transport board 93 by needlepunching. The thickness of the center mold 91 was approximately that of two turns of fibrous tape. The integrity of the braided friction disc preform being manufactured was maintained by the jig 90 during needlepunching thereby preventing excessive distortion of the annulus during needlepunching. The jig 90 is needed to enable controlled passage of a preform being manufactured through a conventional needle loom whose feed mechanism includes powered rollers at its inlet and outlet.

Use of the jig 90 is as follows. A length of fibrous tape sufficient to encircle the center mold is cut and laid out on the transport board around the center mold in a circular manner with a slight overlap of the tape ends. A slight overlap of the ends of the fibrous tape first applied to the transport board is provided to ensure that the ends of the tape do not separate during initial needlepunching of the developing preform structure. Upon passage of the developing preform structure through the needlepunch loom, movement and deformation may occur which tend to cause the part being needlepuched to become egg-shaped due to elongation in the direction of passage. Use of jig 90 minimizes such undesired movement and deformation. Less movement and deformation of the developing preform structure occurs as subsequently added annular fibrous layers are joined by needlepunching. An end of the fibrous tape is indexed relative to a point on the center mold or transport board and thereafter the jig and annular fibrous tape layer is passed through the needlepunch loom. The needlepunch loom stroke is adjusted to cause the needles to partially penetrate the transport board, e.g., about ¼ inch and lightly needle the layers of the annular fibrous tape to itself while lightly tacking it to the transport board. Excessive needling at this step is to be avoided because this will result in the fibrous tape being securely bound to the transport board from which it must later be removed. After this first pass through the needle loom, the jig 90 including the fibrous annulus is rotated ninety (90) degrees with reference to zero index position and again passed through the needle loom in the opposite direction using standard needlepunching procedures.

Thereafter, a second annular layer of fibrous tape is placed upon the first. The ends of this second fibrous tape layer are indexed relative to the ends of the first fibrous tape layer by sixty (60) degrees from the spliced area of the first first fibrous tape layer. The ends of the second annular fibrous layer are abutted. Overlapping of the second and any subsequently added annular fibrous layers is believed unnecessary because little movement is expected to occur during needlepunching of these. The indexing direction is consistent throughout fabrication to assure proper relative relationship of the fibrous layers, i.e., to avoid stacking of their abutted ends. The bed plate of the needlepunch loom is lowered an amount such that the needles penetrate into the first annular fibrous tape but do not penetrate the transport board beneath the first annular fibrous tape. The assembly is passed through the needlepunch loom several times with rotation of the annulus being formed relative to the board ninety (90) degrees prior to each needlepunch loom pass without adding additional fibrous material. Conventional needlepunching equipment and procedures are employed.

Additional annular fibrous layers are added one at a time, each having a butt splice indexed 60 degrees from that of the preceding underlying layer. Following the addition of each annular fibrous layer, the assembly is passed through the needlepunch loom several times with ninety (90) degrees rotation prior to each pass after the first. The bed plate is lowered as each additional layer of fibrous material is added to compensate for the added thickness of the preform disc being formed.

Figure 8:
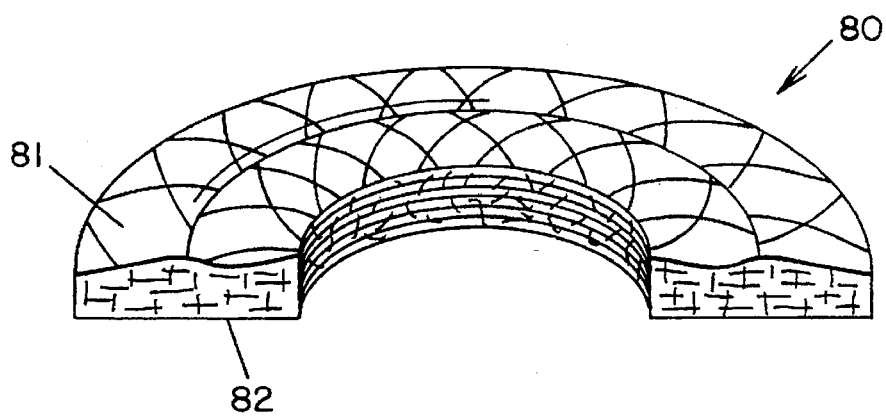
FIG. 8 is an elevational view in section of an embodiment of a needlepunched structure according to an embodiment of the invention.

Having reference to FIG. 8, after the addition of several layers each formed of flattened tubular braided layers, e.g., about 5 or 6, the braided needlepunched structure may be observed to have a material thickness profile relative to the upper supporting surface 92 of the transport board 93 that is building up faster adjacent the ID of each braid of the preform than the OD of such braid. This is due to the inherent slight nonuniformity of the circumferentially uniform tubular braid as it is flattened and forced from a straight to a annular shape. Overlapping of the selvedges of a plurality of laterally adjacent fibrous tapes may exacerbate buildup at the overlapped region. To accommodate this nonplanar buildup, the stripper plate of the needlepunch loom is raised in addition to lowering the bed plate.

It is to be understood that FIG. 8 is intentionally exaggerated and that deviation of fiber volume and outer contour can be minimized or eliminated by careful choice of braids construction, layup and needlepunching procedure.

Upon reaching the desired thickness through the addition of further annular fibrous layers, the preform is flipped over and passed again through the needlepunch loom with ninety (90) degrees rotation after each pass. Thereafter, the preform is flipped back to its position prior to flipping and subjected to additional needlepunching passes without addition of further fibrous material. As before, the preform is rotated between successive needlepunch loom passes. The preform is thereafter removed from the transport board. If the preform is distorted or elongated from its desired annular configuration and dimensions, a concentric preform such as preform 80 shown in FIG. 8 is cut therefrom in conventional manner, e.g. by hydraulic die technique. Where curved braids are used, the upper surface 81 of preform 80 may be bowed somewhat due to the nonuniformity inherent in curving an otherwise uniform straight flattened tubular braid as well as due to overlapping of the selvedges of a pair of laterally adjacent braided tapes. The lower surface 82 of preform 80 is flat due to its having been in supporting contact with transport board surface 92. The jig 90 described in Example 2 may be reused. In the event the transport board 93 becomes compressed through use, additional layers of PAN or OPF or other suitable material may be added. If the center mold 91 becomes spongy after repeated passes through the needlepunch loom, e.g., in the case of neoprene or, e.g., in the case where it is formed of fibrous material it should be replaced with a new center mold.

The resulting needlepunched structure 80 may be thereafter subjected to CVD densification in conventional manner to produce a friction disc similar in appearance to disc 10 shown in FIG. 1 having an average or bulk density of about 1.8 g/cc with little variation in density from its ID periphery to its OD periphery. As used herein "density" is determined by weighing a specimen of known dimensions, such as that obtained by machining from the region of interest of a larger specimen, and is expressed as weight per unit volume, e.g., g/cc. As used herein "bulk density" is the weight per unit volume of the entire specimen and is normally expressed as g/cc.

A plurality of such densified discs made according to the invention may be machined in conventional manner and assembled to form a multi-disc brake similar to that shown and described in any of U.S. Pat. Nos. 4,018,482; 4,878,563; and 4,613,017.

For a final machined friction disc of 1.2 inches thickness, a preform having an appearance like that shown in FIG. 8 of about 1.8 thickness inches is suggested. Shrinkage of about 10 to 15 volume percent is anticipated during conversion in known manner of the OPF to carbon fiber.

Fibers such as cotton or rayon or fugitive fibers such as polyester fibers may be introduced during manufacture to enhance proccessability. As used herein, the term "fugitive" refers to materials which are removed or destroyed during subsequent processing, such as by solvent extraction or melting or thermal degradation, e.g. during subsequent furnacing of the friction disc being made. Cotton and rayon fibers are not considered fugitive because there remains a carbon fiber char upon furnacing. Cotton and rayon fibers are considered to be among "precursors of carbon fibers". It is believed that in certain preferred embodiments that such cellulosic or fugitive fibers may be blended with staple OPF to form blended yarns to be used in forming unidirectionals. The use of such blended staple fiber yarns is expected to facilitate manufacture of unidirectionals of varying size and/or other properties dependent upon the properties of the constituent staple fibers. Recycled or virgin OPF staple may be used in the manufacture of yarns to be formed into the braided fabric or other fibrous tapes to be used in manufacture of shaped fibrous structures of the invention. Braided, woven or knitted structures according to the invention can be formed entirely of reclaimed OPF.

It is preferred that the tows be of PAN fiber in its oxidized state (OPF) when subjected to all textile processes described herein. While it may be possible to produce suitable preform discs out of greige PAN fiber and thereafter oxidize such preforms in a batch method as opposed to the continuous oxidation method employed in the manufacture of oxidized PAN fiber, this is not deemed most economical, particularly because prior to oxidation the PAN fiber does not have the desired high density nor is it able to withstand the high temperature of the furnace cycles desired to be employed subsequent to formation of the preform disc.

While the invention is illustrated using tapes of flattened tubular braids, each of which provides two fabric layers except at its lengthwise extending edges, it is also within the invention to use a flat braid or use a tape formed by slitting lengthwise a tubular braid to form a tape having a single fabric layer rather than two fabric layers or to use other forms of fibrous tapes including woven, knitted and needlepunched tapes.

It is also believed possible, although not preferred, to employ carbonized tow. The carbonized tow may have a higher density compared to OPF including but not limited to 1.74 to 1.78 g/cc. Disc preforms made of such carbonized tow may have a higher density at the time of entering the subsequent furnace cycles and thus may be expected to require less initial time in such subsequent furnace cycles, but could be more difficult to densify to a desired final density in the range of about 1.79 g/cc to about 1.85 g/cc. Due to the conductive nature of such carbonized tows, electrical components of such machinery must be sealed in a manner to prevent conductive particulate matter from the tows from shorting out such electrical equipment. Machinery of this type including braiders and needlepunching looms is commercially available.

While the invention has been described with reference to the use of tow, it is within the invention to use yarn formed of continuous filaments or staple fibers or blends of these in place of tow.

What is claimed is:

1. A method of making an annular near net shape multi-layered fibrous structure having a first radial width defined as the radial distance between the inside diameter periphery and the outside diameter periphery of the annular shape and a thickness comprising the steps of: providing a flat stack of annular layers of fibrous material one layer on top of another, each layer having a second radial width generally corresponding to the first radial width radial distance between the inside diameter periphery and the outside diameter of the fibrous structure to be formed; forming at least one of said layers of at least two portions of fibrous tape that are laterally adjacent substantially throughout their entire length and of a width less than the first radial width of the fibrous structure to be formed; and needlepunching the stacked layers to produce cross-linking of the layers by fibers displaced out of the layers and extending in a direction generally perpendicular to the faces of the layers.

2. The method of claim 1 further comprising forming said one layer by partially overlapping the peripheral selvedges of at least two laterally adjacent portions of fibrous tape of a width less than the first radial width of the fibrous structure to be formed.

3. The method of claim 1 further comprising forming said one layer by abutting the selvedges of at least two laterally adjacent portions of fibrous tape of a width less than the first radial width of the fibrous structure to be formed.

4. The method of claim 1 further comprising forming said one layer by sewing together said at least two laterally adjacent portions of fibrous tape of a width less than the first radial width of the fibrous structure to be formed.

5. The method of claim 1 further including stacking a plurality of said one fibrous layers each formed of partially overlapped braided fibrous tape portions.

6. The method of claim 1 further comprising the steps of forming said one layer of partially overlapped fibrous tape portions and stacking said one layer with another fibrous layer of different construction.

7. The method of claim 1, further comprising forming the tape as a flattened tubular braid and introducing unidirectionals into the braid as it is being formed.

8. The method of claim 7 further comprising forming the fibrous tapes forming said one layer from flattened tubular braid having an upper and a lower layer and laterally offsetting the unidirectionals of the upper layer of the braid relative to the unidirectionals of the lower layer of the braid.

9. The method of claim 1, further comprising forming said one layer as a flat annulus by spirally winding the fibrous tape from adjacent the inside diameter periphery to adjacent the outside diameter periphery of the annulus and overlapping or abutting the peripheral selvedges of adjacent turns of the tape.

10. The method of claim 9, further comprising offsetting the selvedges of the succeeding turns of the fibrous tape forming said one layer relative to the selvedges of the turns of tape forming the preceding said one layer.

11. The method of claim 10, further comprising forming the fibrous tape as a tubular braid and introducing unidirectionals into the braid as it is formed.

12. The method of claim 11, further comprising varying the size of the unidirectionals in a predetermined manner.

13. The method of claim 11, further comprising varying the spacing of the unidirectionals in a predetermined manner.

14. The method of claim 9, further comprising forming the fibrous tape as a tubular braid and introducing unidirectionals into the braid as it is formed.

15. The method of claim 14, further comprising varying the size of the unidirectionals in a predetermined manner.

16. The method of claim 14, further comprising varying the spacing of the unidirectionals in a predetermined manner.

17. The method of claim 9 wherein the tape is a braided tape that is spirally laid down between the inside diameter periphery and the outside diameter periphery of the annulus and helically from bottom to top of the annulus.

18. The method of claim 17 wherein the layers are laterally offset such that the selvedges of the tape are not aligned throughout the height of the stack.

19. The method of claim 1 wherein the fibrous tape is formed from the group consisting of PAN fibers including OPF, carbon fibers, graphite fibers, ceramic fibers, precursors of carbon fibers and precursors of ceramic fibers, and mixtures of these.

20. The method of claim 1, further including binding together the cross-linked layers by a matrix selected from the group consisting of carbon, ceramic, precursor of carbon, precursor of ceramic, and mixtures of these.

21. A method of making an annular near net shape multi-layered fibrous structure having a first radial width defined as the radial distance between the inside diameter periphery and the outside diameter periphery of the annular shape and a thickness comprising the steps of: providing a flat stack of layers of fibrous material one layer on top of another, each layer having a second radial width generally corresponding to that of the fibrous structure to be formed; forming at least one of said layers as a flat annulus of at least two portions of fibrous tape of a width less than the first radial width of the fibrous structure to be formed, the tape portions being laterally adjacent over substantially their entire length; and needlepunching the stacked layers to produce cross-linking of the layers by fibers displaced out of the layers and extending in a direction generally perpendicular to the faces of the layers, the method further comprising forming the flat annulus by helically winding at least two fibrous tapes that are laterally adjacent over substantially their entire length.

22. The method of claim 21 wherein the fibrous tape is formed from the group consisting of PAN fibers including OPF, carbon fibers, graphite fibers, ceramic fibers, precursors of carbon fibers and precursors of ceramic fibers, and mixtures of these.

23. The method of claim 21, further including binding together the cross-linked layers by a matrix selected from the group consisting of carbon, ceramic, precursor of carbon, precursor of ceramic, and mixtures of these.

24. A method of making a near net shape multi-layered fibrous structure in the general shape of a flat annulus having a first radial width defined as the radial distance between the inside diameter periphery and the outside diameter periphery of the annular shape and a thickness comprising the steps of: providing a flat stack of layers of fibrous material one layer on top of another, each layer having a second radial width generally corresponding to the first radial width of the fibrous structure to be formed; forming at least one of said layers as a flat annulus of at least two portions of fibrous tape of a width less than the first radial width of the fibrous structure to be formed, the tape portions being laterally adjacent over substantially their entire length; and needlepunching the stacked layers to produce cross-linking of the layers by fibers displaced out of the layers and extending in a direction generally perpendicular to the faces of the layers, the method further comprising maintaining the fiber volume generally uniform from adjacent inside diameter periphery to adjacent the outside diameter periphery of the annulus.

25. The method of claim 24 wherein the fibrous tape is formed from the group consisting of PAN fibers including OPF, carbon fibers, graphite fibers, ceramic fibers, precursors of carbon fibers and precursors of ceramic fibers, and mixtures of these.

26. The method of claim 24, further including binding together the cross-linked layers by a matrix selected from the group consisting of carbon, ceramic, precursor of carbon, precursor of ceramic, and mixtures of these.

27. A method of making a near net shape multi-layered fibrous structure in the general shape of a flat annulus having a first radial width defined as the radial distance between the inside diameter periphery and the outside diameter periphery of the annular shape and a thickness comprising the steps of: providing a flat stack of layers of fibrous material one layer on top of another, each layer having a second radial width generally corresponding to the first radial width of the fibrous structure to be formed; forming at least one of said layers as a flat annulus of at least two portions of fibrous tape of a width less than the first radial width of the fibrous structure to be formed, the tape portions being laterally adjacent over substantially their entire length; and needlepunching the stacked layers to produce cross-linking of the layers by fibers displaced out of the layers and extending in a direction generally perpendicular to the faces of the layers, the method further comprising increasing the fiber volume in predetermined manner at and adjacent at least one of the inside diameter periphery and the outside diameter periphery of the annulus.

28. The method of claim 27 wherein the fibrous tape is formed from the group consisting of PAN fibers including OPF, carbon fibers, graphite fibers, ceramic fibers, precursors of carbon fibers and precursors of ceramic fibers, and mixtures of these.

29. The method of claim 27, further including binding together the cross-linked layers by a matrix selected from the group consisting of carbon, ceramic, precursor of carbon, precursor of ceramic, and mixtures of these.

30. A method of making an annular near net shape multi-layered fibrous structure having a first radial width defined as the radial distance between the inside diameter periphery and the outside diameter periphery of the annular shape and a thickness comprising the steps of: providing a flat stack of layers of fibrous material one layer on top of another by interleaving and concurrently helically winding a plurality of fibrous tapes, each layer having a second radial width generally corresponding to the first radial width of the fibrous structure to be formed; and needlepunching the stacked layers to produce cross-linking of the layers by fibers displaced out of the layers and extending in a direction generally perpendicular to the faces of the layers, at least one of the interleaved helically wound fibrous tapes itself being formed of a plurality of braided tapes that are laterally adjacent substantially throughout their entire length and of a width less than the second radial width.

31. The method of claim 30 wherein the fibrous tape is formed from the group consisting of PAN fibers including OPF, carbon fibers, graphite fibers, ceramic fibers, precursors of carbon fibers and precursors of ceramic fibers, and mixtures of these.

32. The method of claim 30, further including binding together the cross-linked layers by a matrix selected from the group consisting of carbon, ceramic, precursor of carbon, precursor of ceramic, and mixtures of these.

* * * * *